US 12,450,658 B2

(12) United States Patent
Snyder et al.

(10) Patent No.: US 12,450,658 B2
(45) Date of Patent: Oct. 21, 2025

(54) SYSTEMS AND METHODS FOR ADMINISTERING AN EXCHANGE TRADED PRODUCT (ETP) THAT OPERATES ENTIRELY IN CRYPTOCURRENCY/BLOCKCHAIN

(71) Applicant: Jura Pentium AG, Zug (CH)

(72) Inventors: Ophelia Snyder, New York, NY (US); Hany Rashwan, New York, NY (US)

(73) Assignee: Jura Pentium AG, Zug (CH)

( * ) Notice: Subject to any disclaimer, the term of this patent is extended or adjusted under 35 U.S.C. 154(b) by 0 days.

(21) Appl. No.: 18/618,669

(22) Filed: Mar. 27, 2024

(65) Prior Publication Data
US 2024/0273624 A1 Aug. 15, 2024

Related U.S. Application Data

(63) Continuation of application No. 18/385,111, filed on Oct. 30, 2023, now Pat. No. 11,966,976, which is a
(Continued)

(51) Int. Cl.
*G06Q 40/04* (2012.01)
*G06F 9/54* (2006.01)
(Continued)

(52) U.S. Cl.
CPC .......... *G06Q 40/04* (2013.01); *G06F 9/547* (2013.01); *G06F 16/254* (2019.01);
(Continued)

(58) Field of Classification Search
CPC ........ G06Q 40/04; G06Q 40/02; G06Q 40/12; G06Q 20/0655; G06Q 20/108;
(Continued)

(56) References Cited

U.S. PATENT DOCUMENTS 9,965,804 B1  5/2018  Winklevoss et al.
11,282,139 B1 *  3/2022  Winklevoss ........... G06Q 40/04
(Continued)

OTHER PUBLICATIONS

Hu et al., "The SEC and Regulation of Exchange Traded Funds: A Commendable Start and a Welcome Invitation", 92 S. Cal. L. Rev. 1155 (Jul. 2019), pp. 1155-1202 (Year: 2019).*
(Continued)

*Primary Examiner* — James D Nigh
(74) *Attorney, Agent, or Firm* — Kilpatrick Townsend & Stockton LLP

(57) ABSTRACT

A crypto ETP is administered by a portfolio modeling computer/(PMC), a fund administration computer/(FAC), an order taking platform computer/(OTP), a custodian computer/(CC), and a paying agent settlement computer/(PASC). The PMC defines the ETP and captures data for a cryptocurrency index. The CC tracks Underlying Assets held by the ETP, and sends the data to the FAC, which calculates the NAV of the Underlying Assets to generate a Portfolio Composite File/(PCF) sent to the OTP. The OTP receives and validates/confirms with the CC, orders for creations and redemptions of the ETP from Authorized Parties/(APs), in exchange for the Underlying Assets and/or cryptocurrency. The PASC provides settlement on the Exchange in cryptocurrency by: receiving confirmation from the CC of transfer of underlyings, ETPs or cryptocurrency from the APs to a blockchain wallet associated with the PCM; and issuing units of the ETPs, underlyings or cryptocurrency to the APs.

20 Claims, 28 Drawing Sheets

Related U.S. Application Data continuation of application No. 18/229,424, filed on Aug. 2, 2023, now Pat. No. 11,836,801, which is a continuation of application No. 16/832,030, filed on Mar. 27, 2020, now Pat. No. 11,810,190.

(60) Provisional application No. 62/824,800, filed on Mar. 27, 2019.

(51) Int. Cl.
| | | |
|---|---|---|
| *G06F 16/25* | (2019.01) | |
| *G06F 16/901* | (2019.01) | |
| *G06F 21/60* | (2013.01) | |
| *G06Q 20/06* | (2012.01) | |
| *G06Q 20/10* | (2012.01) | |
| *G06Q 20/36* | (2012.01) | |
| *G06Q 20/40* | (2012.01) | |
| *G06Q 20/42* | (2012.01) | |
| *G06Q 40/02* | (2023.01) | |
| *G06Q 40/12* | (2023.01) | |
| *H04L 9/00* | (2022.01) | |
| *H04L 9/06* | (2006.01) | |
| *H04L 9/32* | (2006.01) | |
| *H04L 9/40* | (2022.01) | |

(52) U.S. Cl.
CPC ....... *G06F 21/602* (2013.01); *G06Q 20/0655* (2013.01); *G06Q 20/108* (2013.01); *G06Q 20/3672* (2013.01); *G06Q 20/3678* (2013.01); *G06Q 20/4014* (2013.01); *G06Q 20/42* (2013.01); *G06Q 40/02* (2013.01); *G06Q 40/12* (2013.12); *H04L 9/0637* (2013.01); *G06Q 2220/00* (2013.01); *H04L 9/50* (2022.05); *H04L 2209/56* (2013.01)

(58) Field of Classification Search
CPC ........... G06Q 20/3672; G06Q 20/3678; G06Q 20/4014; G06Q 20/42; G06Q 20/065; G06Q 2220/00; G06F 9/547; G06F 16/254; G06F 16/9024; G06F 21/602; H04L 9/0637; H04L 9/50; H04L 9/3239; H04L 2209/56; H04L 63/12
USPC ......................................................... 705/66
See application file for complete search history.

(56) References Cited

U.S. PATENT DOCUMENTS

| | | | |
|---|---|---|---|
| 11,810,190 | B2 | 11/2023 | Snyder et al. |
| 11,836,801 | B1 | 12/2023 | Snyder et al. |
| 11,893,636 | B1 * | 2/2024 | Bryant ................. H04L 51/046 |
| 2016/0321752 | A1 | 11/2016 | Tabacco et al. |
| 2017/0046689 | A1 | 2/2017 | Lohe et al. |
| 2017/0085545 | A1 | 3/2017 | Lohe et al. |
| 2017/0109735 | A1 | 4/2017 | Sheng et al. |
| 2017/0206603 | A1 | 7/2017 | Al-Masoud |
| 2019/0333149 | A1 * | 10/2019 | Kim .................... G06Q 20/3678 |
| 2020/0143471 | A1 * | 5/2020 | Jackson ............. G06Q 20/3678 |

OTHER PUBLICATIONS

Appendices cited in Jackson reference US 2020/014371 from U.S. Appl. No. 62/756,570, filed Nov. 6, 2018 (Year: 2018).*

"Free Delivery", Available Online at: https://www.nasdaq.com/glossary/f/free-delivery, Accessed from Internet on Jul. 11, 2022, pp. 1-5.

"Investopedia Stock Analysis: Three Points of Difference Between Bitcoin ETFs and Commodity ETFs", Dialog, Available Online at: https://dialog.proquest.com/professional/docview/2083874885/1813DEASA1CF4B7E2/10?accountid=131444, Aug. 6, 2018, pp. 1-3.

"Stoxx Technical Information", Zug, Jun. 16, 2020, 4 pages.

U.S. Appl. No. 16/832,030, "Corrected Notice of Allowability", Sep. 25, 2023, 2 pages.

U.S. Appl. No. 16/832,030, "Final Office Action", Dec. 23, 2022, 34 pages.

U.S. Appl. No. 16/832,030, "Non-Final Office Action", Jul. 11, 2023, 15 pages.

U.S. Appl. No. 16/832,030, "Non-Final Office Action", Jul. 15, 2022, 28 pages.

U.S. Appl. No. 16/832,030, "Notice of Allowance", Aug. 11, 2023, 9 pages.

U.S. Appl. No. 18/229,424, "Notice of Allowance", Oct. 18, 2023, 12 pages.

U.S. Appl. No. 18/385,111, "Notice of Allowance", Dec. 22, 2023, 10 pages.

Carrel, "What the US can Learn from Sweden About How to Launch a Bitcoin Fund", CNBC, Available Online at: https://www.cnbe.com/2018/01/17/sec-frets-over-bitcoin-etfs-but-swedes-figured-it-out-years-ago.html, Jan. 17, 2018, pp. 1-12.

Chen, "Exchange Traded Product (ETP)", Investopedia, Available Online at: https://www.investopedia.com/terms/e/exchange-traded-products-etp.asp, Accessed from Internet on Jul. 7, 2022, pp. 1-11.

Crea, et al., "Cryptocurrency Exchange Traded Products: If, When, and How", The Investment Lawyer, vol. 25, No. 12, Dec. 2018, pp. 3-15.

Da, et al., "Exchange Traded Funds and Asset Return Correlations", European Financial Management, Sep. 16, 2017, pp. 136-168.

Doherty, et al., "SEC Pushes Back Against Fidelity, BlackRock Spot Bitcoin ETF Filings", Available online at: www.bloomberg.com, Jun. 30, 2023, pp. 1-7.

Hosoi, "What is Timestamping?", Globalsign, Feb. 10, 2017, pp. 1-7.

McKenna, "Investing in Cryptocurrency: 2 Blockchain ETFs Launch", Dialog ProQuest, Jan. 20, 2018, pp. 1-4.

PCT App. No. PCT/US2020/033541, "International Search Report and Written Opinion", Sep. 3, 2020, 12 pages.

Schwartzkopff, et al., "CRYPTO20: The First Tokenized Cryptocurrency Index Fund", Oct. 15, 2017, pp. 1-16.

SG App. No. SG11202110172R, "Written Opinion", Aug. 17, 2023, 9 pages.

* cited by examiner

PCF Creation (T-1)

Portfolio Composite File ("PCF") creation by the Administrator & Accounting Team takes place on every trading day and the file serves as the basis for daily NAV calculation and AP order placement

| Step | Timing | Actions | Parties |
|---|---|---|---|
| 1 | T-1<br>11:30 EST/<br>17:30<br>Zurich Time | • Index Calculation Agent calculates daily index closing value with fixed 17:00 Zurich Time exchange rates and provides Index Composition File[1] via secure FTP to the Issuer, Administrator & Accounting Team | ●●●<br>○ |
| 2 | T-1<br>11:30 EST/<br>10:30 CST<br>17:30 CET | • Custodian provides Daily Account Statements to Administrator via API or OTP, Accounting Team, and Issuer with balances of Underlying Assets | ●●●<br>○ |
| 3 | T-1<br>By 3:00pm EST/<br>21:00 CET | • Accounting Team calculates daily NAV, PCF and Fees[2], and uploads PCF to OTP | ●●○ |
| 4 | T-1<br>Upon<br>completion<br>of Step 4 | • OTP generates automatic notification to APs and OTC Partners about new PCF<br>• [Optional] Issuer sends PCF in PDF & Excel format to Liquidity Partners and APs via email° | ○○●<br>● |

Notes:
1. See Appendix B - Index Composition File
2. See Appendix C - PCF Sample

*FIG. 2A*

Authorized Participant Creation Order - In Kind

| Step | Timing | Actions | Parties |
|---|---|---|---|
| 1-4 | T-1 | • PCF Creation (See PCF Creation) for details | |
| 5 | T<br>9:00 EST/<br>15:00<br>Zurich Time | • Authorized Participant places creation order[1] on OTP, and places settlement instruction to its back office<br>• OTP generates a notification to Issuer, Administrator, Global Paying Agent and Custodian | |
| 6 | T<br>By EOD<br>EST | • Issuer delivers In-Kind Deposit/Withdrawal Form to Custodian[2]<br>• Administrator confirms Order Confirmation[3] and uploads to OTP<br>• Issuer prepares any relevant Final Terms | |
| 7 | T+1<br>7:00 EST/<br>13:00<br>Zurich Time | • APs transfer the Underlying to Issuer's transaction wallet managed by the Custodian pursuant to settlement information received in the Order Confirmation Form.<br>Each AP will have a designated transfer wallet<br>• AP will provide trade confirmation/screenshot of trade ID if needed | |
| 8 | T+1<br>Upon completion of Step 8 | • Transfer confirmed via Blockchain<br>• Custodian confirms receipt of Underlyings to the Issuer, the Administrator, and Global Paying Agent | |
| 9 | T+1<br>Upon completion of Step 8 | • Upon confirmation via Blockchain, Global Paying Agent immediately issues respective units of ETPs to AP via entry in the Issuer's book of uncertificated securities (Wertrechtebuch)[4] on behalf of the Issuer<br>• Concurrently, Global Paying Agent to (i) register new units of ETPs in the main register of SIX SIS and (ii) to credit these to the AP's account with SIX SIS (creation of new ETPs as intermediated securities (Bucheffekten)) via delivery free of payment (DfP) transfer instructions | |
| 10 | T+1 | • Final Terms & Conditions posted by Issuer on public website for series upsize[5] | |
| 11 | T+1<br>By Market Close | • SIX SIS clears ETPs on a DFP/FOP basis and create securities in AP account at CSD<br>• Global Paying Agent notifies the Issuer and the Administrator | |

Notes:
1. See Appendix D - Order Form
2. See Appendix E - Deposit/Withdrawal Form
3. See Appendix F - Order Confirmation Form
4. See Appendix G - Book of Uncertificated Securities
5. In case of new series, final T&C need to be submitted to SIX before issuing note

*FIG. 3A*

Authorized Participant Redemption Order - In Kind

| Step | Timing | Actions | Parties |
|---|---|---|---|
| 1-4 | T-1 | • PCF Creation (See PCF Creation) for details | |
| 5-6 | T | • Order Placement (See Authorized Participant Creation Order - In Kind for details) | |
| 107 | T+1 9:00 EST/ 15:00 Zurich Time | • Issuer instructs Custodian to prepare withdraw and retrieve Underlyings from cold storage using In-Kind Withdrawal Form[1] | |
| 108 | T+1 9:00 EST/ 15:00 Zurich Time | • Global Paying Agent (i) deregisters new units of ETPs in the main register of SIX SIS and (ii) to debit these from the AP's account with SIX SIS (redemption of new ETPs as intermediated securities (Bucheffekten)) via delivery free of payment (DfP) transfer instructions | |
| 109 | T+1 Upon completion of Step 8 | • Global Paying Agent cancels respective units of ETPs to AP via entry in the Issuers book of uncertificated securities (Wertrechtebuch)[2] on the Issuer's behalf<br>• Global Paying Agent notifies Issuer and Administrator | |
| 110 | T+1 10:00 EST/ 16:00 Zurich Time | • Issuer confirms In-Kind Withdrawal on phone with Custodian, instructing Custodian to move relevant Underlyings from ETP to AP's wallet/account per settlement instructions provided in the order form[2] | |
| 111 | T+1 Upon completion of Step 10 | • Custodian transfer the Underlyings to AP's designated wallet addresses | |
| 112 | T+1 By EOB Zurich | • Transfer confirmed on blockchain<br>• AP confirms receipt of relevant Underlyings | |

Notes:
1. See Appendix E - Deposit/Withdrawal Form
2. See Appendix G - Book of Uncertificated Securities

*FIG. 4A*

Authorized Participant Creation Order - Cash

| Step | Timing | Actions | Parties |
|---|---|---|---|
| 1-4 | T-1 | • PCF Creation (See PCF Creation) for details | |
| 205 | T<br>7:00 EST/<br>13:00<br>Zurich Time | • Authorized Participant places creation order[1] on ONYX, and places settlement instruction to its back office<br>• ONYX generates a notification to Issuer, Administrator, Calculation Agent, Global Paying Agent, Custodian, Lending Desk, and OTC Desk | |
| 206 | T<br>By EOD<br>EST | • Issuer confirms Order Confirmation[2] and uploads to ONYX | |
| 207 | T+1<br>7:00 EST/<br>13:00<br>Zurich Time | • Global Paying Agent immediately issues respective units of ETPs to AP via entry in the Issuer's book of uncertificated securities (Wertrechtebuch)[3] on behalf of the Issuer<br>• Concurrently, Global Paying Agent to (i) register new units of ETPs in the main register of SIX SIS and (ii) to credit these to the AP's account with SIX SIS (creation of new ETPs as intermediated securities (Bucheffekten)) via delivery vs. payment (DVP) transfer instructions | |
| 208 | T+1<br>Upon<br>completion<br>of Step 7 | • Transfer confirmed via custodian API<br>• Custodian confirms receipt of Cash to the Issuer, the Administrator, Calculation Agent and Global Paying Agent | |
| 209 | T+1 | • Final Terms & Conditions posted by Issuer on public website for series upsize[4] | |
| 210 | T+1<br>By Market<br>Close | • SIX SIS clears ETPs on a DFP/FOP basis and create securities in AP account at CSD<br>• Global Paying Agent notifies Issuer | |

Notes:
1. See Appendix C - Order Form
2. See Appendix E - Order Confirmation Form
3. See Appendix F - Book of Uncertificated Securities
4. In case of new series, final T&C need to be submitted to SIX before issuing note

*FIG. 5A*

Authorized Participant Redemption Order - Cash

| Step | Timing | Actions | Parties |
|---|---|---|---|
| 1-4 | T-1 | • PCF Creation (See PCF Creation for details) | |
| 5-6 | T | • Order Placement (See Authorized Participant Creation Order - In Kind for details) | |
| 407 | T+1 9:00 EST/ 15:00 Zurich Time | • Issuer instructs Custodian to prepare withdraw and retreive Cash from account using [Using wire instructions] <br> • Issuer unwinds the short sale | |
| 408 | T+1 9:00 EST/ 15:00 Zurich Time | • Global Paying Agent (i) deregisters new units of ETPs in the main register of SIX SIS and (ii) to debit these from the AP's account with SIX SIS (redemption of new ETPs as intermediated securities (Bucheffekten)) via delivery free of payment (DVP) transfer instructions | |
| 409 | T+1 Upon completion of Step 8 | • Global Paying Agent cancels respective units of ETPs to AP via entry in the Issuers book of uncertificated securities (Wertrechtebuch)[1] on the Issuer's behalf <br> • Global Paying Agent notifies Issuer and Adminstrator | |
| 410 | T+1 By EOB Zurich | • Transfer confirmed on Global Settling Agent <br> • AP confirms receipt of relevant Cash | |

Notes:
1. See Appendix F - Book of Uncertificated Securities

*FIG. 6A*

ONYX | Dashboard | PCFs | Orders | Books | Upload Statements | Admin | greg@amun.com

[Dashboard]

[All] [Flow Traders] [Jane Street]

[Orders] [PCF Indicator]

Latest Order Status
ABTC20200325-02-01-001

Pending — Confirmed — Settled

[Order Details]

Recent Orders

| IDENTIFIER | TYPE | UNITS | CREATED | STATUS |
|---|---|---|---|---|
| ABTC20200325-02-01-001 | CREATION | 1 | 2020/03/25 | CONFIRMED |
| SBTC20200318-01-01-001 | CREATION | 4 | 2020/03/18 | CONFIRMED |
| ABTC20200316-01-02-001 | REDEMPTION | 3 | 2020/03/16 | SETTLED |
| H20200316-01-01-001 | CREATION | 3 | 2020/03/16 | SETTLED |
| MOON20200313-01-01-001 | CREATION | 1 | 2020/03/13 | SETTLED |

[Order History]

*FIG. 6E*

ONYX | Dashboard | PCFs | Orders | Books | Upload Statements | Admin | greg@amun.com

[Dashboard]

[Orders] [PCF Indicator]

[All] [Flow Traders] [Jane Street]

Latest Order Status
SBTC20200318-01-01-001

● Pending — ● Confirmed — ● Settled

[Order Details]

Recent Orders

| IDENTIFIER | TYPE | UNITS | CREATED | STATUS |
|---|---|---|---|---|
| SBTC20200318-01-01-001 | CREATION | 4 | 2020/03/18 | CONFIRMED |
| ABTC20200316-01-02-001 | REDEMPTION | 3 | 2020/03/16 | SETTLED |
| H20200316-01-01-001 | CREATION | 3 | 2020/03/16 | SETTLED |
| MOON20200313-01-01-001 | CREATION | 1 | 2020/03/13 | SETTLED |
| KEY20200313-01-01-001 | CREATION | 1 | 2020/03/13 | SETTLED |

[Order History]

Provided by: Index Calculation Agent
Distributed to: Issuer, Administrator and APs
Available via: FTP and website

- Index Composition File is prepared after market close at 5pm CET daily
- Please refer to Index Guide, available at Index Calculation Agent's website, for more details
- An example of the file is as below:

| Date | 9/25/2018 |
|---|---|
| Index Value | 2050.8 |
| Index Divisor | 7316351605 |

| Name | Ticker | Currency | FX_Rate | Close | Amount_Out | Cap_Factor | Market_Cap | Unit_Mcap | Weight | Index_Shares | Index_Value |
|---|---|---|---|---|---|---|---|---|---|---|---|
| Bitcoin | BTC | USD | 1 | 6404.59 | 17235950 | 663.0776 | 1.1E+11 | 7.32E+13 | 0.487824 | 0.156205 | 1000.429 |
| Ethereum | ETH | BTC | 6404.59 | 0.03283 | 1.02E+08 | 1239.138 | 2.14E+10 | 2.65E+13 | 0.176427 | 1.720782 | 361.8163 |
| XRP | XRP | BTC | 6404.59 | 7.09E-05 | 3.96E+10 | 2132.029 | 1.8E+10 | 3.83E+13 | 0.255477 | 1154.471 | 523.9329 |
| Bitcoin Cash | BCH | BTC | 6404.59 | 0.06658 | 17317288 | 1038.65 | 7.38E+09 | 7.67E+12 | 0.051116 | 0.245835 | 104.8285 |
| Litecoin | LTC | BTC | 6404.59 | 0.008712 | 58040730 | 1350.886 | 3.24E+09 | 4.37E+12 | 0.023156 | 1.071635 | 59.79379 |

FIG. 8

Provided by: Administrator
Distributed to: Issuer, APs and Global Paying Agent
Available via: OTP

- PCF specifies the price for next trading day for minimum order size in both in-kind and fiat value
- Investor Fee Output specifies the daily fees for the Issuer in in-kind form
- Number of coins goes out to 8 decimal points except for XRP, which goes out to 6 decimal points

| Portfolio Composition File | |
|---|---|
| Date | 3-Dec-2018 |
| For Trading Day | 4-Dec-2018 |
| ISIN | CHXXXXXXXX |
| Minimum Order Size | X,XXX |
| NAV ($) per Minimum Order | XX,XXX.XX |
| Product NAV per Unit ($) | XX.XX |
| Name | Deliverables per Minimum Order |
| Bitcoin | X.XXXXXXXX |
| XRP | X.XXXXXX |
| Ethereum | X.XXXXXXXX |
| Bitcoin Cash ABC | X.XXXXXXXX |
| Litecoin | X.XXXXXXXX |

| Investor Fee Output | |
|---|---|
| Date | 3-Dec-2018 |
| For Trading Day | 4-Dec-2018 |
| Name | Investor Fees in Kind |
| Bitcoin | X.XXXXXXXX |
| XRP | X.XXXXXX |
| Ethereum | X.XXXXXXXX |
| Bitcoin Cash ABC | X.XXXXXXXX |
| Litecoin | X.XXXXXXXX |

*FIG. 9*

Filled by: APs
Distributed to: Issuer, APs, Administrator and Global Paying Agent
Available via: OTP Order Number
Order number is automatically generated based on the information from the order form.
It's used throughout order process as reference. Order number is consisted of:
1. Series Letter
2. Date that the order is created
3. AP code
4. Order Type
5. Sequence of the order for that trading day Items for AP to Provide During Onboarding
1. Wallet Addresses to be whitelisted by the Custodian
2. Settlement information at SIX SIS Items for AP to Fill Out
Most of the items in the order form is pre-loaded with the following items that need AP to manually fill out:
1. Creation or Redemption Order
2. Number of Units
    • Number of securities equals to Number of units multiplying minimum order size (ex. 5,000 for HODL)

*FIG. 10*

| Amun Crypto Basket Index ETP Order No. HXXXXXXXX-XX-XX-XXX | |
|---|---|
| Product Information | |
| Product Name: | Amun Crypto Basket Index ETP |
| Series Name: | Series H |
| Series Letter: | H |
| Product ISIN: | XXXXXX |
| Deal Information | |
| Deal Date: | XX-XX-XXXX |
| Settlement Date: | XX-XX-XXXX |
| Creation/Redemption: | CREATE |
| Authorized Participant: | XX |
| Login Unique Identifier: | XX@XX.com |
| AP Code: | XX |
| Number of Units: | X |
| Number of Securities: | XXXXX |
| Settlement Type: | DFP/FOP |
| Approximate Expected Deliverables | |
| Bitcoin | X.XXXXXXXX |
| Ethereum | X.XXXXXX |
| Ripple | X.XXXXXXXX |
| Bitcoin Cash | X.XXXXXXXX |
| Litecoin | X.XXXXXXXX |
| Your Wallet Information | |
| Bitcoin | XXXXXXXXXXXXXXXXXXXXXXXXXXXXXXXXXX |
| Ethereum | XXXXXXXXXXXXXXXXXXXXXXXXXXXXXXXXXX |
| Ripple | XXXXXXXXXXXXXXXXXXXXXXXXXXXXXXXXXX |
| Bitcoin Cash | XXXXXXXXXXXXXXXXXXXXXXXXXXXXXXXXXX |
| Litecoin | XXXXXXXXXXXXXXXXXXXXXXXXXXXXXXXXXX |
| Settlement Information | |
| BP ID (SIX SIS AG): | XXXX |
| Delivery/Receive | RECEIVE |
| Terms | |

All Creation Orders are subject to the terms and conditions of the Base Prospectus and the applicable Final Terms of the relevant AMUN AG Exchange Traded Products as currently in effect (and attached hereto) and the Authorized Participant Agreement between the Authorized Person and AMUN AG. All representations and warranties of the Authorized Participant set forth in the Authorized Participant Agreement are incorporated herein by reference.

Capitalized terms used but not defined herein shall have the meaning given to them in the Authorized Participant Agreement dated as of XX.XX.XXXX entered into by the Authorized Participant and AMUN AG.

The undersigned does hereby certify as of the date set forth below that he/she is an Authorized Person under the Authorized Participant Agreement and that he/she is authorized to deliver this Creation Order to AMUN AG on behalf of the Authorized Participant.

Date:
Name:

*FIG. 10 (cont.)*

Filled by: Issuer  
Distributed to: Custodian  
Available via: Email

This form is used by the Issuer to notify and instruct the Custodian on transfer in or out of crypto currencies or fiat currencies.

SECTION 1 - Account Information

Kingdom Trust Account Name: [ ]  Kingdom Trust Account Number: [ ]
Daytime Phone Number: [ ]

SECTION 2 - Instructions

| Deposit/Withdrawal | Quantity | Asset Description | Price/Each | Total |
|---|---|---|---|---|
| | | | | |
| | | | | |
| | | | | |
| | | | | |
| | | | | |

SECTION 3 - Transaction Information

For in-kind deposits, you must attach accompanying documents (i.e. screenshot of the transfer from the originating wallet) for the information provided in the fields below.

Origination Wallet Address: [ ]
Transaction Confirmation/Origination Documents: [ ]
Source of Fiat Funds: [ ]

For in-kind withdrawals, Kingdom Trust will only complete in-kind withdrawals sent to wallets titled to the Kingdom Trust account holder.

Destination Wallet Information/Title: [ ]
Destination Wallet Address: [ ]

SECTION 4 - Representations and Signature

I state I am employed by the fund/company below in the file also specified below. I am empowered by the fund/company and authorized to make the representations made on this form and attest to the truth and accuracy thereof. I hereby attest that the wallet address[es] listed above is/are the property of the fund/company. The fund/company has researched and confirmed the source and chain of ownership of any digital assets it places in the wallet, determined such digital assets have not been used in any unlawful manner and that the fund/company is currently and has, at all times, been in compliance with all AML/BSA laws and requirements. By signing below, I declare the information herein is true and correct.

Fund/Company Name: [ ]
Authorized Signer Signature: [ ]  Title of Signer: [ ]
Authorized Signer Printed Name: [ ]  Date(mm/dd/yy): [ ]

*FIG. 11*

Filled by: OTP
Distributed to: Issuer, APs, Administrator and Global Paying Agent
Available via: OTP

Amun Crypto Basket Index ETP Order Confirmation No. HXXXXXXXX-XX-XX-XXX

Product Information

| | |
|---|---|
| Product Name: | Amun Crypto Basket Index ETP |
| Series Name: | Series H |
| Series Letter: | H |
| Tranche Number: | X |
| Product ISIN: | XXXXXXXXXXXX |
| Product Ticker: | HODL |
| Product Currency: | USD |
| Product NAV per Minimum Order Size: | XXXX |

Deal Information

| | |
|---|---|
| Deal Date: | XX-XX-XXXX |
| Settlement Date: | XX-XX-XXXX |
| Creation/Redemption: | CREATE |
| Deal Type: | In-Kind |
| Authorized Participant: | XX |
| Login Unique Identifier: | XX@XX.com |
| AP Code: | XX |
| Number of Units: | X |
| Number of Securities: | XXXXX |
| Settlement Type: | DFP/FOP |

Deal Deliverables

| | |
|---|---|
| Bitcoin | X.XXXXXXXX |
| Ethereum | X.XXXXXX |
| Ripple | X.XXXXXXXX |
| Bitcoin Cash | X.XXXXXXXX |
| Litecoin | X.XXXXXXXX |

Custodian Information

| | |
|---|---|
| Custodian: | The Kingdom Trust Company |
| Bitcoin | XXXXXXXXXXXXXXXXXXXXXXXXXXXXXXXX |
| Ethereum | XXXXXXXXXXXXXXXXXXXXXXXXXXXXXXXX |
| Ripple | XXXXXXXXXXXXXXXXXXXXXXXXXXXXXXXX |
| Bitcoin Cash | XXXXXXXXXXXXXXXXXXXXXXXXXXXXXXXX |
| Litecoin | XXXXXXXXXXXXXXXXXXXXXXXXXXXXXXXX |

*FIG. 12*

| AP Information | |
|---|---|
| AP Name | XXX |
| Using screenshot & Transaction ID | Yes |
| Bitcoin | XXXXXXXXXXXXXXXXXXXXXXXXXXXXXXXXXX |
| Ethereum | XXXXXXXXXXXXXXXXXXXXXXXXXXXXXXXXXX |
| Ripple | XXXXXXXXXXXXXXXXXXXXXXXXXXXXXXXXXX |
| Bitcoin Cash | XXXXXXXXXXXXXXXXXXXXXXXXXXXXXXXXXX |
| Litecoin | XXXXXXXXXXXXXXXXXXXXXXXXXXXXXXXXXX |
| Settlement Information | |
| AP BP ID (SIX SIS AG): | XXXX |
| AP Delivery/Receive | RECEIVE |
| Issuer BP ID (SIX SIS AG): | XXXX |
| Issuer Delivery/Receive | Delivery |
| Settlement Date: | XX-XX-XXXX |

Terms

All Creation Orders are subject to the terms and conditions of the Base Prospectus and the applicable Final Terms of the relevant AMUN AG Exchange Traded Products as currently in effect (and attached hereto) and the Authorized Participant Agreement between the Authorized Person and AMUN AG. All representations and warranties of the Authorized Participant set forth in the Authorized Participant Agreement are incorporated herein by reference.

Capitalized terms used but not defined herein shall have the meaning given to them in the Authorized Participant Agreement dated as of XX.XX.XXXX entered into by the Authorized Participant and AMUN AG.

The undersigned does hereby certify as of the date set forth below that he/she is an Authorized Person under the Authorized Participant Agreement and that he/she is authorized to deliver this Creation Order to AMUN AG on behalf of the Authorized Participant.

Date: XXXX
Name: XXXX

*FIG. 12 (cont.)*

| Filled by: | Global Paying Agent | | | | | | |
|---|---|---|---|---|---|---|---|
| Distributed to: | Issuer | | | | | | |
| Available via: | OTP and email | | | | | | |

| Amun AG | | | | | | | |
|---|---|---|---|---|---|---|---|
| 19 Dammestrasse | | | | | | | |
| 6300 Zug | | | | | | | |
| Switzerland | | | | | | | |
| Product Name: | | [• Product Name] | | | | | |
| Currency: | | [• United States Dollars (U.S.$)] | | | | | |
| Maturity Date: | | Open-ended | | | | | |
| Conditions: | | According to the General Terms and Conditions of the Issuer's Exchange Traded Products Programme dated as of [•], as completed by the Final Terms dated [•]. | | | | | |
| Register of Uncertificated Securities (Wertrechtebuch) | | | | | | | |
| Date | Entry Number | Counter Party (AP) | Counter Party address | Number of Units (+/-) | Total Units Outstanding | | |
| 1/1/2018 | 1 | Flow Traders | | 50 | 50 | | |
| 1/1/2018 | 2 | Jane Street | | 50 | 100 | | |
| 1/2/2018 | 3 | Flow Traders | | -25 | 75 | | |

*FIG. 13*

SYSTEMS AND METHODS FOR ADMINISTERING AN EXCHANGE TRADED PRODUCT (ETP) THAT OPERATES ENTIRELY IN CRYPTOCURRENCY/BLOCKCHAIN

This application is a continuation of U.S. patent application Ser. No. 18/385,111, titled "Cryptocurrency Exchange Traded Product," filed on Oct. 30, 2023, which is a continuation of U.S. patent application Ser. No. 18/229,424, titled "Systems and Methods for Administering an Exchange Traded Product (ETP) That Operates Entirely in Cryptocurrency/Blockchain," filed on Aug. 2, 2023, which is a continuation of U.S. patent application Ser. No. 16/832,030, titled "Systems and Methods for Administering an Exchange Traded Product (ETP) That Operates Entirely in Cryptocurrency/Blockchain," filed on Mar. 27, 2020, which claims the benefit of U.S. Provisional Patent Application Ser. No. 62/824,800, entitled "Systems and Methods for Administering an Exchange Traded Product (ETP) That Operates Entirely in Cryptocurrency/Blockchain," filed on Mar. 27, 2019, the contents of each of which are incorporated herein by reference in their entirety for all purposes.

BACKGROUND

Technical Field

This invention relates to data management systems and more particularly to an automated system for aggregating and transforming data from disparate market trading and portfolio management computers to model and produce an exchange-traded product of cryptocurrencies having units tradable on a secondary market exchange.

Background Information

An OMS (order management system), also referred to as an OTP (order taking platform) is a specialized computer system developed to manage and execute securities orders in an efficient and cost-effective manner. These systems execute at volumes, speeds and with levels of security and redundancy that require specialized computer hardware and software. Many versions of OMSs have been developed by various entities for use by particular parties to perform their distinct roles in the securities order and trading process. For example, OMSs are used on both the buy-side (e.g., by a fund) and the sell-side (e.g., brokers and dealers), with differing functionality. Brokers and dealers use OMSs specifically customized for their sell-side use when filling orders for various types of securities and are able to track the progress of each order throughout the system. Markets (exchanges) use OMSs that have been specifically customized for their use to manage their operations. Typically only exchange members can connect directly to an exchange, which means that sell-side OMSs may have exchange connectivity, whereas buy-side OMSs are concerned with connecting to sell-side firms. OMSs allow firms to input orders to the system for routing to pre-established destinations. They also allow firms to change, cancel and update orders. When an order is executed on the sell-side, the sell-side OMS must then update its state and send an execution report to the order's originating firm. OMSs support portfolio management by translating intended asset allocation changes into marketable orders for the buy-side. These asset allocation changes typically involve rebalancing a fund's asset allocation to correct for market valuation changes and cashflows, to align an Index Fund with its target index, and to make discretionary or tactical changes initiated by fund managers.

Exchange Traded Products (ETPs), including Exchange Traded Funds (ETFs), Exchange Traded Commodities (ETCs), Exchange Traded Notes (ETNs), and Exchange Traded Instruments (ETIs), etc., can take a variety of forms. The most common, ETFs, are essentially a special type of mutual fund (or, less commonly, unit investment trust (UIT)) whose shares trade on a securities exchange. ETF shares may be created or redeemed in unit basket amounts by broker-dealer firms serving as "authorized participants" in the ETF. For most ETFs, creation and redemption of units takes place primarily through the delivery of baskets of securities that closely replicate the current unit holdings of the ETF. ETFs that trade publicly in the U.S. are registered under the 1940 Act as mutual funds or UITs, and are subject to the same investment restrictions as non-ETF versions of those vehicles.

In light of these complexities, specialized exchange-traded fund (ETF) OMSs have been developed to help manage ETFs. ETF OMSs handle the sophisticated operational flows associated with ETFs, including the way their shares are created and redeemed. As mentioned, rather than cash, institutional investors usually deposit a basket ("creation basket") of stocks "in kind" with the fund in exchange for ETF shares. Typically mirroring the ETF's portfolio, the contents of this creation basket are made available publicly on a daily basis. Likewise, ETF shares can be exchanged for a basket ("redemption basket") of securities and, sometimes, cash. ETFs must generate these baskets day after day, involving sophisticated risk analytics as well as specialized front-office systems. The accounting side of the operation must also be managed accurately. A net asset value (NAV) for the ETF must not only be calculated at the end of each day, but also a projected NAV for the following day. And as ETF share prices can fluctuate during the day, the ETF OMS must also generate its own intraday version of the NAV. This in turn will determine the contents and hypothetical value of the next day's basket. An example of an ETF OMS is the FlexOMS ETF platform commercially available from Flex-Trade System, Inc. (Great Neck, NY). ETP OMS solutions are also commercially available from Charles River Development (CRD), Burlington, MA.

ETFs were first introduced in the U.S. market in 1993 and have enjoyed a high rate of growth in assets and trading volume almost since its introduction. The vast majority of ETFs are 'passive', i.e., those based on popular benchmark indexes. Conventional ETFs are based on baskets of conventional assets. It would be desirable, however, to provide ETFs, and ETPs in general, configured to handle cryptocurrency assets. Conventional facilities, including OMSs available for the operational management of passive ETFs are in many respects inappropriate for these 'crypto' ETPs, e.g., because of the difficulty of accurately determining the value, and thus the NAV, of potentially highly volatile crypto assets on a timely basis.

Therefore, a need exists for a system and method capable of retrofitting and leveraging conventional OMSs and Exchange infrastructure to create and manage crypto ETPs.

SUMMARY

The appended claims may serve as a summary of the invention. The features and advantages described herein are not all-inclusive and various embodiments may include some, none, or all of the enumerated advantages. Additionally, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 2A is a table showing operational aspects of an embodiment of the present invention;

FIG. 3A is a table showing additional operational aspects of an embodiment of the present invention;

FIG. 4A is a table showing additional operational aspects of an embodiment of the present invention;

FIG. 5A is a table showing additional operational aspects of an embodiment of the present invention;

FIG. 6A is a table showing additional operational aspects of an embodiment of the present invention;

FIG. 7 is a graphical representation of aspects of an embodiment of the present invention;

FIG. 8 is a table showing exemplary aspects of the embodiments of the present invention;

FIG. 9 is a table showing exemplary aspects of the embodiments of the present invention;

FIG. 10 is a table showing exemplary aspects of the embodiments of the present invention;

FIG. 11 is a table showing exemplary aspects of the embodiments of the present invention;

FIG. 12 is a table showing exemplary aspects of the embodiments of the present invention;

FIG. 13 is a table showing exemplary aspects of the embodiments of the present invention.

DETAILED DESCRIPTION

Figure 1:
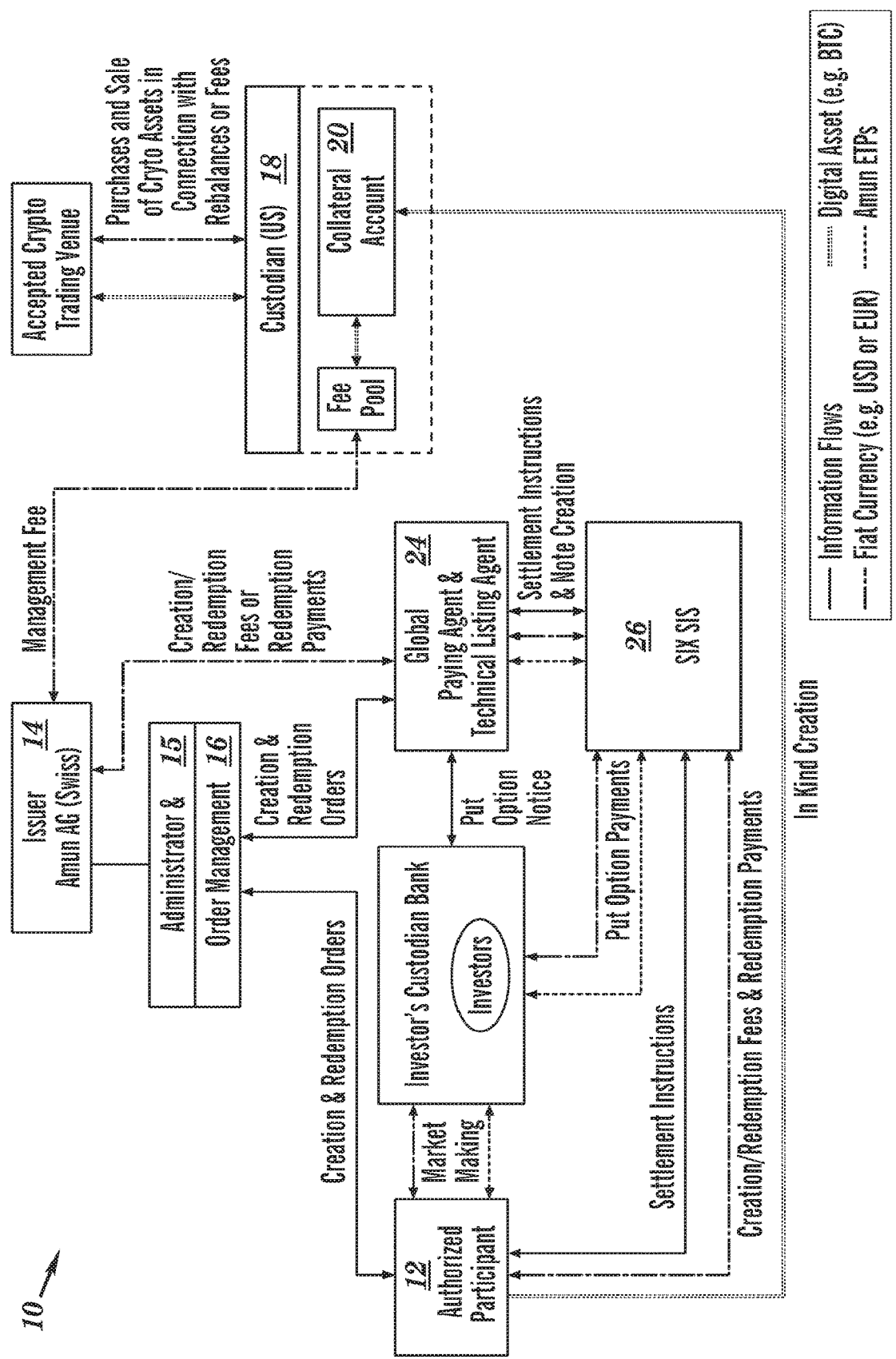
FIG. 1 is a functional block diagram showing structural aspects of one embodiment of the present invention.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

As shown and described in the accompanying Figures, embodiments of the present invention include systems and methods for administering an exchange traded product (ETP) that operates entirely in cryptocurrency/blockchain, e.g., in which the assets underlying the ETP include cryptocurrency, and the currency used to redeem ETP shares (aka 'units') and/or trade the ETP units on secondary markets, is cryptocurrency. Indeed, these embodiments include technical solutions including an accounting process and software that enable the creation of a crypto ETP and the settlement of transactions involving the ETP using a crypto-native process that leverages crypto PCFs (Portfolio Composite Files), crypto-based order taking platforms, blockchain records, and settles against information from public blockchains, running a crypto-native accounting platform.

Aspects of the invention include the recognition that heretofore, no effective solutions were available for creating ETPs or other structured products in the crypto space that address regulators' concerns with regards to the sector. This problem takes various forms:

Slippage on CR/RD (creation/redemption) as well as Rebalancing: given the high volatility in the underlyings, it was virtually impossible to reproduce an index in a daily traded product without creating significant discrepancies vs the benchmark. With the lack of margin lending available, cash actual accounting or other conventional forms of back-charging are unsuited to the space. The instant embodiments lead to a relatively low, if not effectively zero, tracking error versus the benchmark.

Cash-Less Product: In order for the product to work, the instant inventors recognized that aspects of the process needed to be entirely cash-less (e.g., CR/RD, fees, and/or settlement). This is because of the slippage issue mentioned above as well as the need to settle DFP/FOP (Delivery-Free-of-Payment/Free-of-Payment), which is highly uncommon, if not non-existent, in conventional funds/markets.

Pricing: Given the volatility and the lack of consistency across platforms or geographies in the pricing of crypto assets (either in USD or in other currencies), there may be significant discrepancies between the prices shown by data aggregators and executable pricing. This may lead to significant market inefficiencies and can make replicating an index that is settled daily extremely challenging.

Settlement: Prior to the instant invention, there was no infrastructure available to allow people to settle public market securities against blockchain transactions. The instant embodiments bridge the gap between the two markets allowing for close to real time settlement (typically a couple of hours). This helps to effectively eliminate counterparty risk during the transaction and allow all market participants greater visibility into the product.

Custody: Prior to the instant invention, there was no ability to integrate cold storage (i.e., storage for inactive data) into an ETP product to verify deposits which exist on a crypto currency blockchain.

These embodiments thus provide a technical solution made up of process/accounting infrastructure/technical (IT) infrastructure that allows the instant embodiments to run an entirely crypto native ecosystem, including the following.

1) Crypto denominated accounting books with crypto denominated final terms/PCF outputs. US Dollar values are typically only generated as a final output.
2) New OTP configured to run off of crypto inputs and wallet addresses in addition to the traditional cash NAV and SSI system. This allows these embodiments to make the content generated in (1) actionable for APs and other trading counterparties.
3) New settlement process which allows these embodiments to use an entirely crypto settled PCF by making use of information from public blockchains and reconciling this to outputs generated by the OTP in substantially real time.
4) APs are then able to price on exchange based on true execution pricing for the underlyings as opposed to relying on pricing through 3rd party aggregators.

These embodiments thus address the slippage, pricing, and cash-less product concerns as follows.

Slippage: APs are able to CR/RD on a crypto basis. This effectively eliminates the possibility of slippage as the system goes out to 8 decimal places on all orders. APs are able to deliver the precise amount of crypto (Underlying Assets) required.

Pricing: These embodiments run entirely crypto native accounting books and allow users to see a true crypto entitlement of the notes they have purchased. APs can use this to price the notes on exchange in a more understandable, transparent and efficient way based on executable pricing across multiple markets. This results in greater overall market efficiency.

Cash-Less/Settlement: By settling orders entirely in crypto, these embodiments may settle DFP/FOP within a couple of hours by reconciling directly to records on the public blockchain. This provides substantial certainty of deposit/withdrawal regardless of the time of day or the status of the market.

Custody: By integrating directly with block explorers and specialized custodian computers (CCs).

The solution provided by these embodiments is counter-intuitive and contrary to conventional wisdom. These embodiments are highly complex and do not rely on conventional modes of settling and/or pricing because such conventional approaches are unworkable in a crypto context. Running an entirely crypto native system is contrary to existing models because there are no existing solutions capable of operating in a native crypto environment. The instant inventors have built a new technical infrastructure, leveraging various specialized computers, including: a portfolio modeling computer (PMC) 14; a specialized fund administration computer (FAC) 15 that receives Underlying Asset data from a fund database and administers trades throughout a trading day for the ETP; a specialized order taking platform computer (OTP) 16 that interacts with Authorized Participants (APs) to execute creation and redemption orders of the ETP throughout the trading day; a specialized custodian computer (CC) 18; and a specialized paying agent settlement computer (PASC) 24; to support the use of a PCF in crypto, crypto wallet settlement, and reconciliation to public blockchains.

Terminology

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Where used in this disclosure various terms are defined as follows:

CSD means Central Security Depository at SIX, or any other party appointed by the Exchange in which the Product is listed for the purpose of settlement.

DFP/FOP stands for Delivery-Free-of-Payment and Free-of-Payment, respectively. They refer to the same settlement process where a delivery of securities is not linked to a corresponding transfer of funds. In this case only the securities are moved.

DVP refers to delivery versus payment (DVP), a settlement procedure in which the buyer's payment for securities is due at the time of delivery.

ETP means Exchange Traded Products.

Index means Amun Crypto Basket Index (HODL5), Amun Bitcoin Suisse Index (ABBA), Bitwise 10 Select Index (BIT10), or Amun Sygnum Platform Winners Index (MOON), and/or substantially any other group of securities.

OTP means order taking platform hosted by the issuer.

PCF means Portfolio Composite File.

Product means Amun Crypto ETPs, including series & tranches that are issued in the future.

Underlying(s) or Underlying Asset(s) means any or all of the crypto currencies that are the constituents of the Index.

Figure 7:
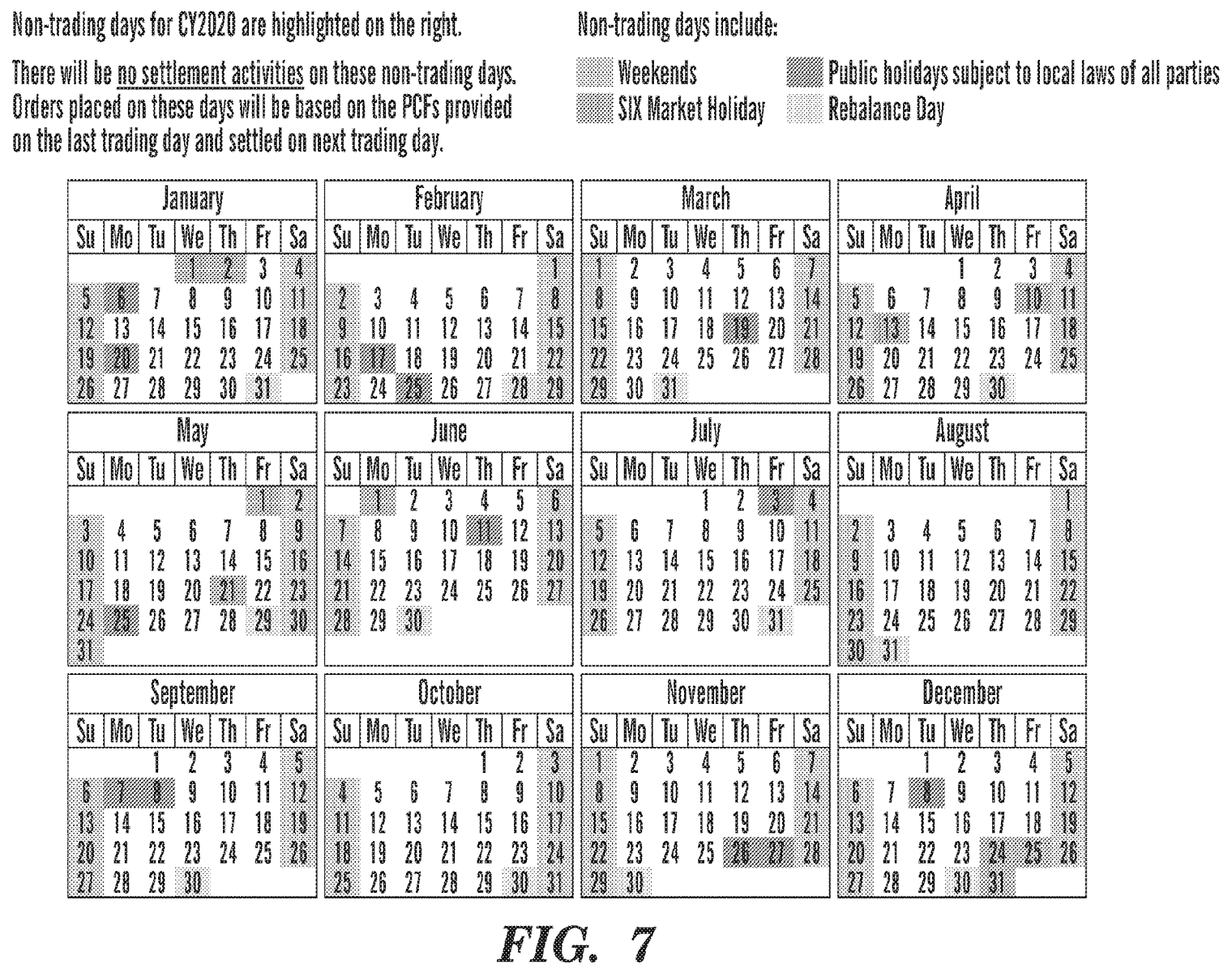

Trading Days means the days that all relevant parties collectively agreed on as the days when the Product trades and operates. In December of every calendar year, relevant parties shall agree on the trading days for next calendar years and Amun shall notify the APs about the agreed schedule. See, e.g., FIG. 7, for details regarding trading day schedule for 2020.

Redemption Process refers two types of redemption: AP Redemption, and Investor and Issuer Redemption, which follow different mechanisms. Although Investor and Issuer Redemption is permitted under limited circumstances, the instant embodiments will be shown and described with respect to the AP Order & Redemption Processes which are expected to be implemented routinely in order to support investor trading of units of the ETP on the Exchange.

EST means Easter Standard Time and CET means Central European Time.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine", "component", "module", "control components/devices", "messenger component or service," and the like are intended to refer to a computer-related entity, including hardware or a combination of hardware and, software. Moreover, the various computer-related entities may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400, as well as big data and NoSQL technologies, such as, but not limited to, Hadoop or Microsoft Azure.

Referring now to the Figures, embodiments of the present invention will be more thoroughly described.

FIG. 1 is a block diagram of an exemplary detailed embodiment of a cryptocurrency basket index ETP system and method in the form of a crypto ETP facility 10. As shown, Authorized Participant(s) 12 initiate the creation or redemption of the ETP from the Issuer 14. Authorized Participants 12 will utilize OTP 16 to place the orders and will use blockchain to transfer Underlying Assets directly to the Custodian 18. Custodian 18 manages and stores the Underlying Assets. In particular embodiments, Administrator 15 provides general administration, accounting and fee calculation among other responsibilities. Collateral Agent 20 is responsible for liquidating the collateral in the event of a default by the issuer 14 pursuant to terms and conditions outlined in an associated prospectus. Index Calculation Agent 30 (FIG. 2B) calculates and publishes the value of the Index. It should be noted that in particular embodiments, Issuer 14 may also serve as the Index Calculation Agent 30, e.g., determining the value of the aforementioned HODL5, ABBA, and/or MOON indexes. A Technical Listing Agent connects the Issuer 14 with the Exchange 26 in the settlement process, while a Global Paying Agent accepts payments from the issuer of a security and then distributes the payments to the holders of the security. In particular embodiments, the Technical Listing Agent and the Global Paying Agent responsibilities are performed by the same entity, e.g., as shown at 24. For convenience of explication, both of these roles will be referred to hereinbelow as being performed by Global Paying Agent ('Agent') 24.

Having described a relatively detailed embodiment of the present invention, in a more generalized embodiment, a system and method is provided that has a series of specialized computers operating as part of a specialized trading network, wherein the computers collectively model and generate data for administering a cryptocurrency basket index exchange-traded product (ETP) for creation and redemption of ETP units, including securely communicating ETP portfolio data with specialized market trading systems, and electronically validating and transforming the ETF portfolio data and basket data. The system includes a portfolio modeling computer (PMC) 14 communicably coupled to: a specialized fund administration computer (FAC) 15 that receives Underlying Asset data from a fund database and administers trades throughout a trading day for the ETP; a specialized order taking platform computer (OTP) 16 that interacts with Authorized Participants (APs) 12 to execute creation and redemption orders of the ETP throughout the trading day; a specialized custodian computer (CC) 18; and a specialized paying agent settlement computer (PASC) 24.

The PMC 14 (a) defines a cryptocurrency basket index exchange traded product (ETP) having a number of ETP units available for sale, the ETP units being tradable on one or more secondary markets (Exchange) 26; and (b) captures via secure File Transfer Protocol (FTP) and/or Application Programming Interface (API), and decrypts, using a blockchain explorer, an encrypted Index Composition File (ICF) generated by an index calculation agent, that includes the composition and value at the end of each trading day of a cryptocurrency basket index.

The CC 18 uses a blockchain explorer to track a portfolio of cryptocurrency assets (Underlying Assets) held by the ETP, at least a portion of the Underlying Assets corresponding to the cryptocurrency basket index, to generate daily portfolio data including account statements with balances of the Underlying Assets, and to encrypt and send the portfolio data to the PMC 14 and FAC 15 in a native CC format via secure FTP and/or API.

The PMC 14 then receives via secure FTP and/or API, and decrypts, during the trading day, the portfolio data from the CC 18, and stores and electronically time-stamps the portfolio data. The FAC 15 receives via secure FTP and/or API, and decrypts, the portfolio data, and calculates, with a blockchain explorer, a current net asset value (NAV) of the Underlying Assets held by the ETP each trading day, to generate a Portfolio Composite File (PCF) that includes the NAV. The FAC 15 encrypts and uploads the PCF via secure FTP and/or API, to the OTP 16.

The OTP 16 receives via secure FTP and/or API, and decrypts, orders for creations and redemptions of the ETP units from at least one Authorized Party (AP) 12, in exchange for the Underlying Assets and/or cryptocurrency, and uses a blockchain explorer to encrypt, transfer, and validate/confirm the orders for creations and redemptions by blockchain to the CC 18, so that the OTP 16 uses the PCF to calculate an amount of Underlying Assets or cryptocurrency to transfer during said creations and redemptions.

The PASC provides settlement of the creations and redemptions of ETP units on the Exchange 26 in cryptocurrency by: receiving confirmation from the CC 18 of transfer of underlyings, ETPs or cryptocurrency from the at least one AP to a blockchain wallet associated with the PCM 14; and issuing respective units of the ETPs, underlyings or cryptocurrency to the at least one AP 12. In this embodiment, the Underlying Assets held by the ETP, settlement currency, and record-keeping, are all based on cryptocurrency and/or blockchain, to support efficient trading of the ETP on the Exchange and/or on other secondary markets.

Moreover, as mentioned, in particular embodiments, the OTP performs its operations automatically through a series of secure FTP and/or API integrations with the other components/parties allowing the system to ensure accuracy of the information that is ultimately disseminated to the market, and to provide a transparent record of the ETP's history.

It should be noted that PCF creation involves integrating, e.g., via the OTP 16, a number of specialized computer systems, to capture and parse data from the various specialized computers using FTP, xls uploads, and/or custom APIs e.g., used by custodians and blockchains, in various native formats (e.g., capturing and parsing files from Custodian(s) and Blockchains in native formats). In particular embodiments this parsed data is aggregated and stored in a local and/or cloud-based database to maintain daily records of this information. The aggregated data may also be distributed to the calculating agents to promote efficiency. Examples of the data captured, parsed, aggregated, and stored, include that which is used to calculate the PCF, including custodian balances, prices from the index providers/aggregators, and/or information from official securities registers/exchanges and blockchains.

In various embodiments, the OTP 16 also provides for automated validation and checking of the PCF. The OTP automatically calculates its own internal PCF which it then checks against the values captured from the Current Valuation Module/Administrator 15. These embodiments are thus able to identify any errors and allow for correction without human intervention, to help reduce cost, overhead, time needed to distribute data and the rate of errors in calculations distributed to the market. The associated decrease in errors allows for more efficient operation of the various specialized computers used with these embodiments, for efficient price discovery and trading.

The following are more detailed descriptions of aspects and features that may be used in various embodiments of the present invention.

Overview of Timeline and Workflow

Referring now to FIGS. 2A-6B, embodiments of the present invention provide for PCF (Portfolio Composite File) creation at day T−1, order placement at day T, and settlement at day T+1. Briefly described, PCF creation involves Issuer/PMC 14 and/or Administrator/FAC 15 creating a file containing the portfolio of Underlying Assets (e.g., crypto currencies that are the constituents of the Index) and the NAV (Net Asset Value) of the portfolio based on index price and allocation. Issuer 14/Administrator 15 then uploads the PCF to OTP 16. APs 12 may then access the PCF for creation and redemption orders, as will be discussed in greater detail hereinbelow. Order placement and documentation preparation takes place on day T and involves an AP 12 placing an order via OTP 16, and the Issuer 14/Administrator 15/OTP 16 confirming the order and preparing necessary documentation for settlement. Settlement takes place on day T+1 and involves the Paying Agent 24 sending settlement instructions to AP 12 via Exchange 26, and Custodian 18 confirming receipt/transfer of deliverables with the AP 12.

Figure 2B:
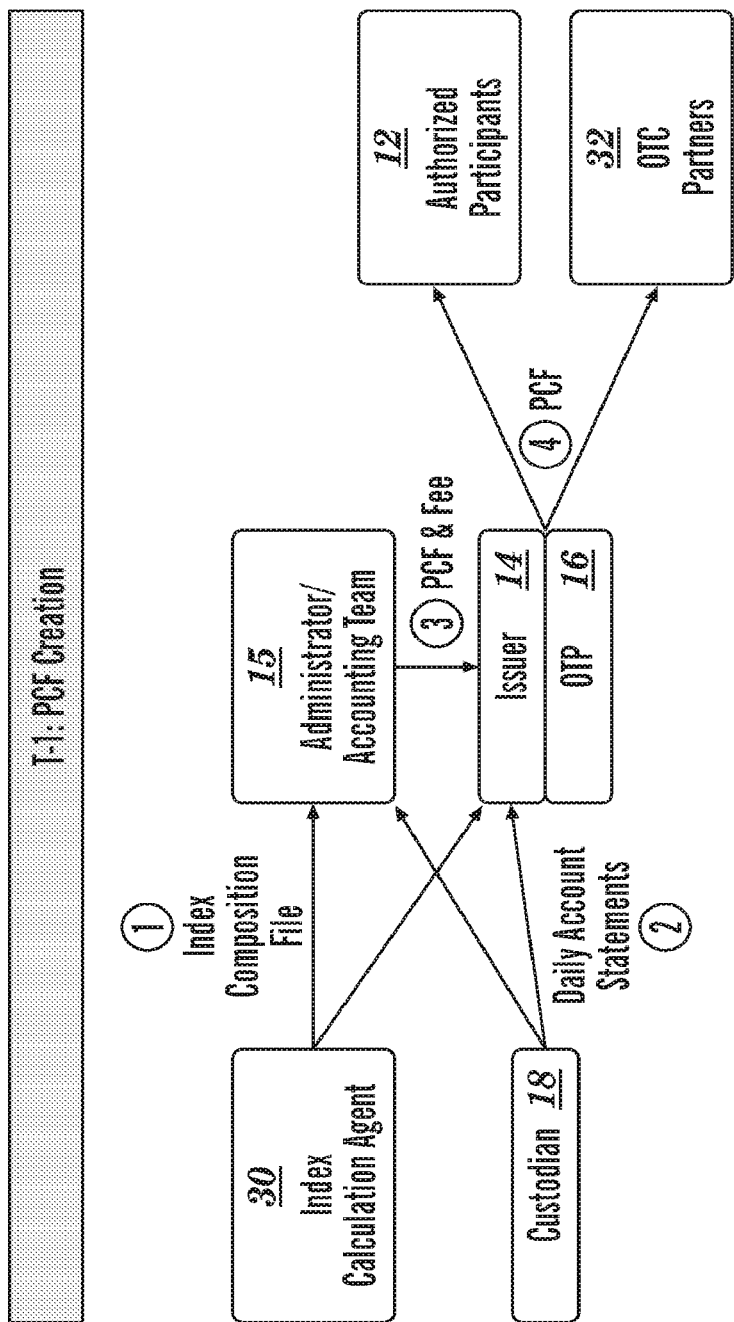
FIG. 2B is a functional block diagram showing the operational aspects of FIG. 2A.

Turning now to FIGS. 2A and 2B, PCF Creation at day T−1 will be discussed in greater detail. At Step 1, at the end of the trading day on day T−1, Index Calculation Agent 30 calculates the closing value of the index portfolio, and includes this closing value in an Index Composition File. An exemplary Index Composition File is shown in FIG. 8. The Index Composition File is then sent, e.g., via secure FTP, to the Issuer 14 directly and/or via Administrator/Accounting Team 15. At Step 2, Custodian 18 provides daily account statements with balances of the underlying assets, to Administrator/Accounting Team 15 and Issuer 14. At Step 3, Accounting/FAC 15 calculates daily NAV, PCF (and associated fees), and uploads the PCF to OTP 16. An exemplary PCF is shown in FIG. 9. At Step 4, OTP 16 sends the PCF and/or generates notification of the new PCF, to APs 12 and any OTC Partners 32.

Operation Procedures

Referring now to FIGS. 3A-6B, Authorized Participant order processes will be shown and described. In particular embodiments, an AP 12 creates and/or redeems products (e.g., units of the ETP) from Issuer 14. These creation and redemption orders are settled on day T+1. In particular embodiments, any orders placed after a pre-determined cut-off time on T will be considered invalid. Similarly, any delivery of underlyings after a pre-determined cut-off time on T+1 may also be canceled.

Figure 3B:
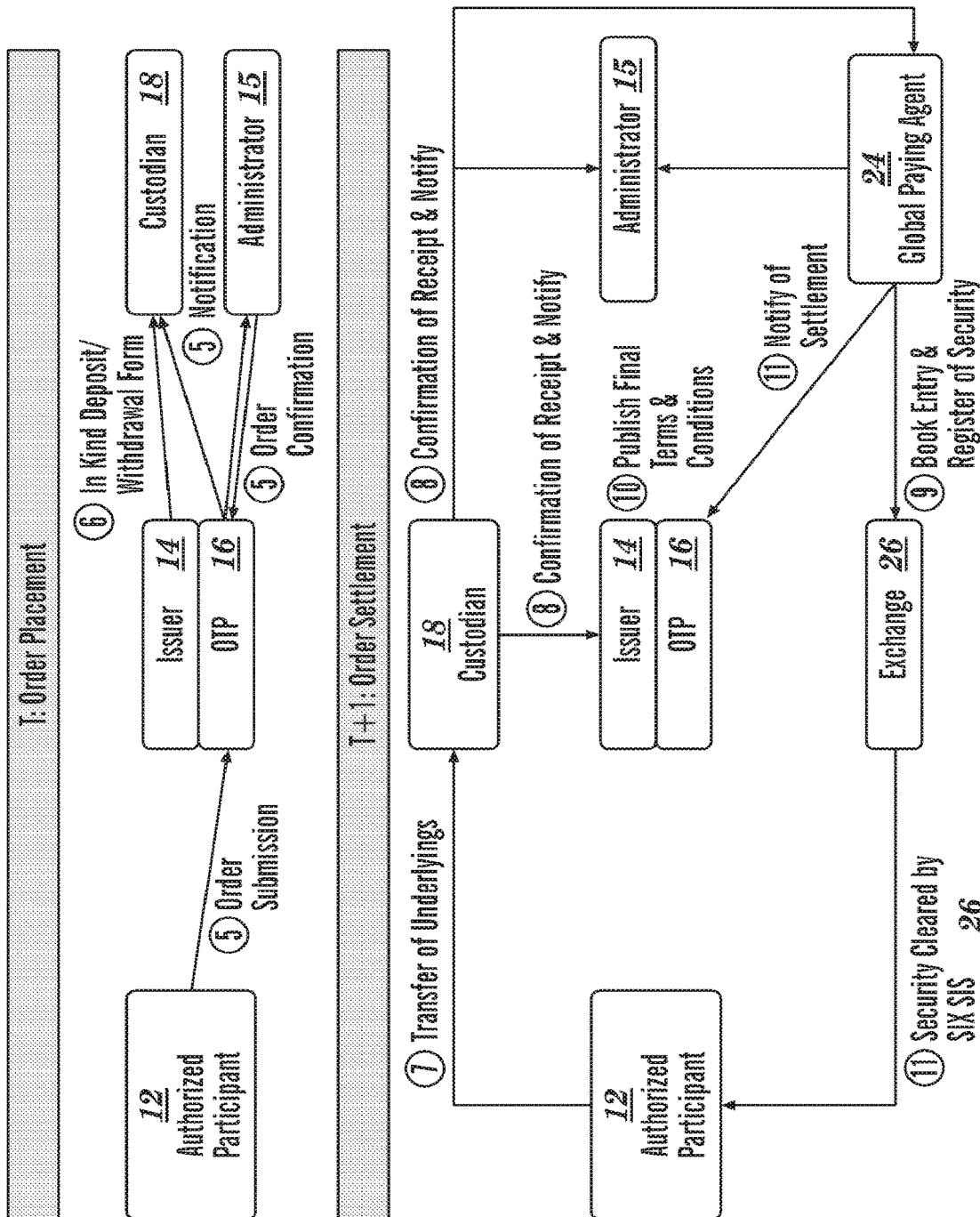
FIG. 3B is a functional block diagram showing the operational aspects of FIG. 3A.
Figure 4B:
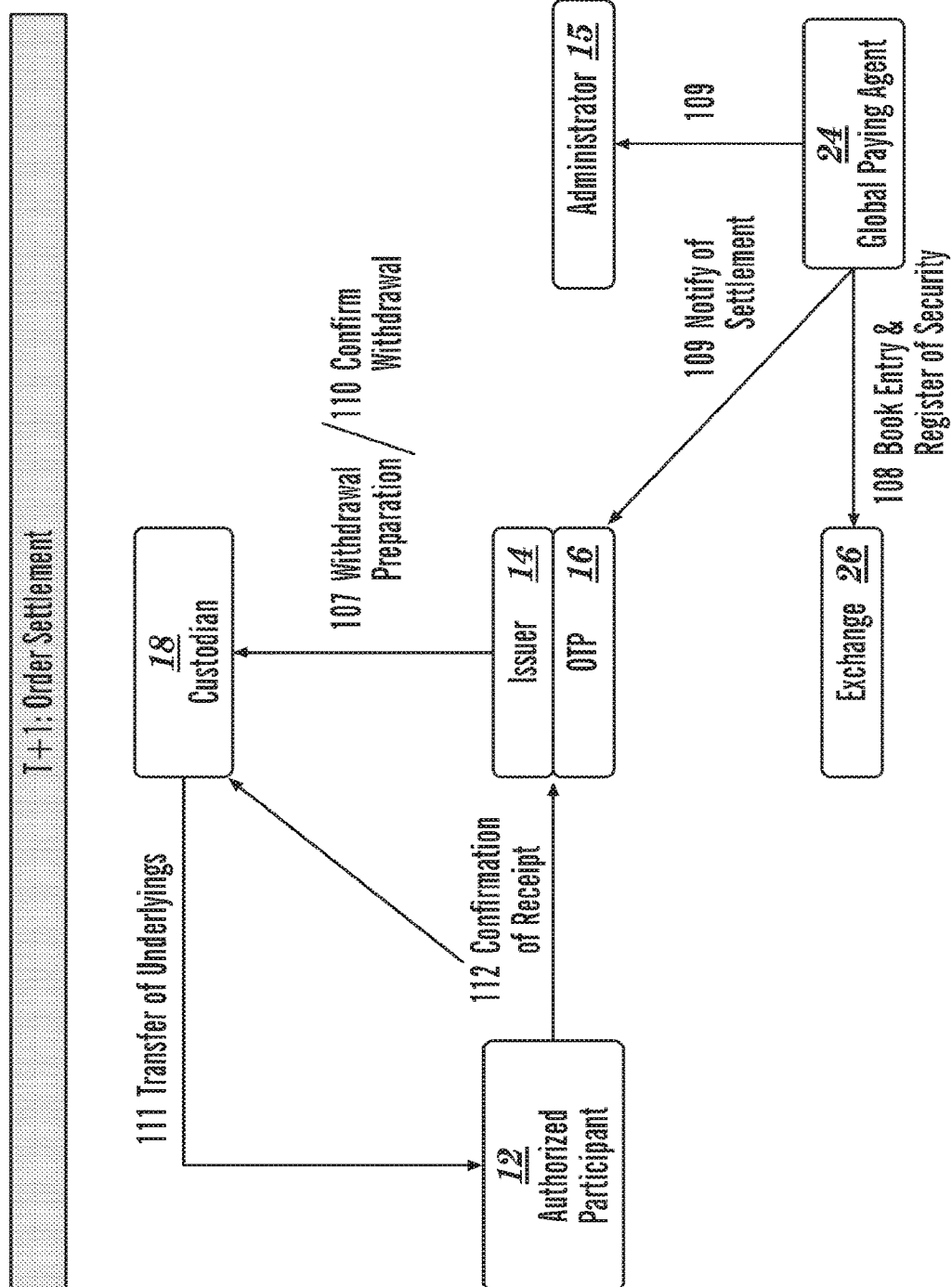
FIG. 4B is a functional block diagram showing the operational aspects of FIG. 4A.

Turning now to FIGS. 3A-4B in particular, two types of order activities will be discussed: Authorized Participant Creation Order—In Kind (FIGS. 3A-3B); and Authorized Participant Redemption Order—In Kind (FIGS. 4A-4B). In should also be noted that in addition to AP Redemptions, particular embodiments also provide for Investor & Issuer Redemption, which will be discussed hereinbelow.

As shown in FIGS. 3A-3B, an In-Kind AP Creation Order involves the aforementioned PCF Creation Steps 1-4, followed by order placement Steps 5 and 6 on day T and order settlement Steps 7-11 on day T+1.

At Step 5, an AP 12 places creation order on OTP 16, and places settlement instruction to its back office. An exemplary creation order form is shown in FIG. 10. OTP 16 automatically generates a notification to Issuer 14, Administrator/FAC 15, Global Paying Agent/PASC 24, and Custodian/CC 18. At Step 6, before the end of day T, Issuer/PMC 14 delivers an in-kind deposit/withdrawal form to Custodian/CC 18 and Administrator/FAC 15 uploads an order confirmation to OTP 16. An exemplary in-kind deposit/withdrawal form is shown in FIG. 11, and an exemplary order confirmation form is shown in FIG. 12.

As mentioned, order settlement involves steps 7-11 on day T+1. At Step 7, APs 12 transfer the underlying assets to a transaction wallet (blockchain wallet) of Issuer 14. In particular embodiments, the AP's transaction wallet is managed by Custodian/CC 18 pursuant to settlement information received in the Order Confirmation Form. Each AP 12 will have a designated transaction wallet. Optionally, the APs 12 may provide trade confirmation/screenshot of a trade ID along with the transfer. At Step 8, the transfer of the underlyings is confirmed by Custodian/CC 18 via blockchain, to Issuer/PMC 14, Administrator/FAC 15, and Global Paying Agent/PASC 24. At Step 9, upon receipt of the confirmation via blockchain, Global Paying Agent/PASC 24 issues respective units of the ETPs to each AP 12 via entry in a book of uncertificated securities maintained by Issuer 14. An exemplary entry into a book of uncertificated securities is shown in FIG. 13. Concurrently, Global Paying Agent/PASC 24 (i) registers new units of ETPs in the main register of Exchange 26 and (ii) credits these to the AP's account at the Exchange 26 via delivery free of payment (DfP) transfer instructions. At Step 10, final Terms & Conditions are posted by Issuer/PMC 14 on public website and in some instances, to Exchange 26. At Step 11, Exchange 26 clears ETPs on a DFP/FOP (Delivery-Free-of-Payment/Free-of-Payment) basis and creates securities in accounts for each AP 12 at CSD (Central Security Depository) (not shown). Also at Step 11, Global Paying Agent/PASC 24 notifies Issuer 14 and Administrator 15 of the transaction.

As shown in FIGS. 4A-4B, an In-Kind AP Redemption Order involves the aforementioned PCF Creation Steps 1-4, followed by AP Creation Order In-Kind Steps 5 and 6, followed by Steps 107-112 on day T+1.

At Step 107, Issuer 14 instructs Custodian/CC 18 to prepare to withdraw and retrieve underlyings from storage using an In-Kind Withdrawal Form, such as shown in FIG. 11. At Step 108, Global Paying Agent/PASC 24: (i) deregisters units of ETPs in the main register of Exchange 26 and (ii) debits these ETPs from the AP's account with Exchange 26 via delivery free of payment (DfP) transfer instructions. Upon completion of Step 108, Step 109 is executed, which involves Global Paying Agent 24 notifying Issuer 14 to cancel respective units of ETPs to AP via entry in the Issuers book of uncertificated securities, e.g., as shown in FIG. 13. Global Paying Agent/PASC 24 also notifies Administrator/FAC 15. At Step 110. Issuer 14 confirms In-Kind Withdrawal, e.g., via phone, with Custodian/CC 18, instructing Custodian 18 to move relevant underlyings from ETP to AP's wallet/account per settlement instructions provided in the aforementioned order form (e.g., of FIG. 11. Upon completion of Step 110, at Step 111, Custodian/CC 18 transfers the underlyings to AP's designated wallet addresses. At Step 112, the transfer is confirmed on blockchain, e.g., by Custodian 18, and AP 12 confirms receipt of the relevant underlyings.

Figure 5B:
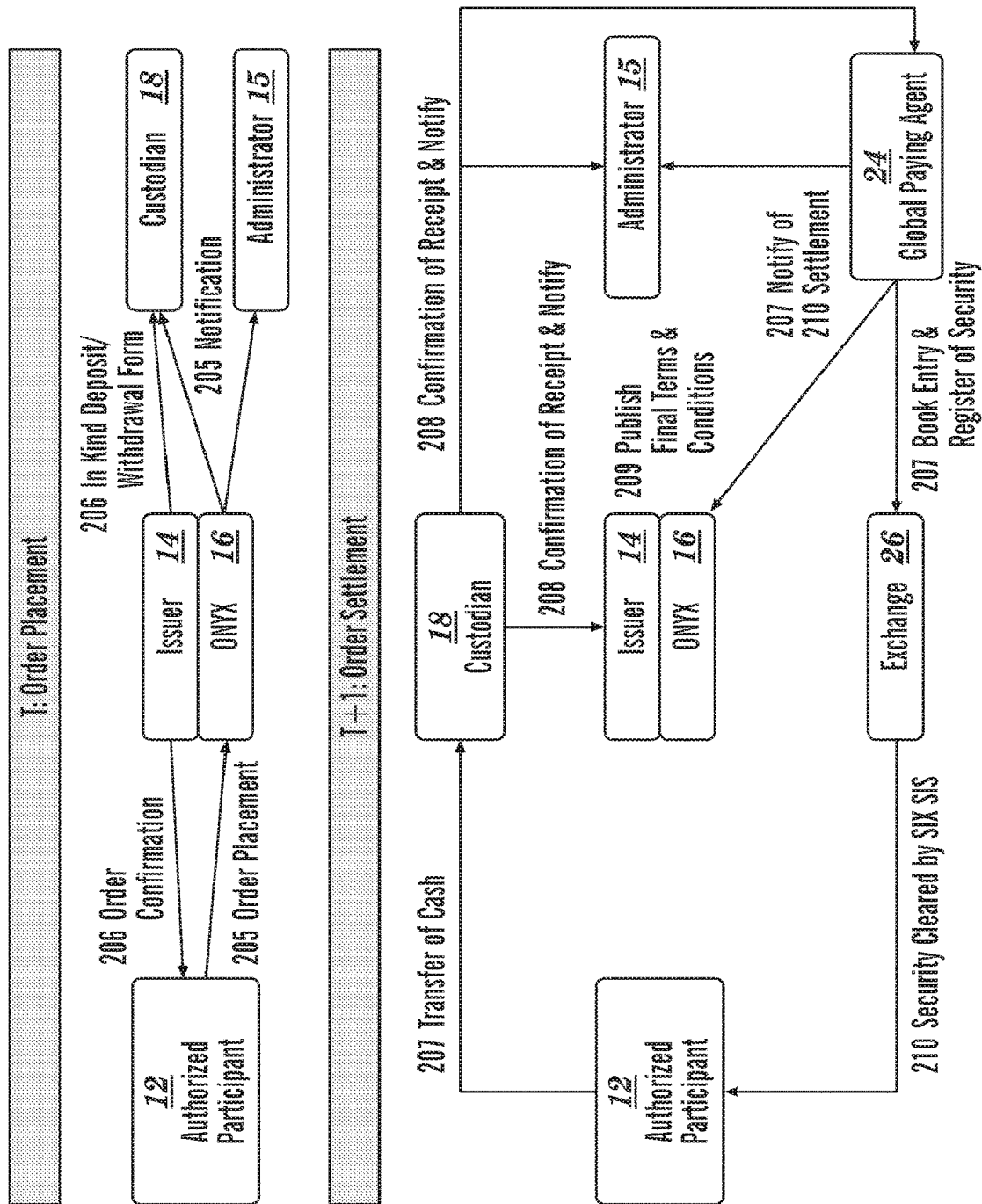
FIG. 5B is a functional block diagram showing the operational aspects of FIG. 5A.

As shown in FIGS. 5A-5B, a Cash AP Creation Order involves the aforementioned PCF Creation Steps 1-4, followed by Steps 205 and 206 on day T, followed by Steps 207-210 on day T+1.

At Step 205, an AP 12 places a creation order on Exchange 16, e.g., using an order form as shown in FIG. 9, along with settlement instructions. Exchange 16 then generates a notification to Issuer/PMC 14, Administrator/FAC 15, and Custodian/CC 18 (and optionally to other parties, e.g., Calculation Agent, Global Paying Agent, Lending Desk, and OTC Desk, etc. (It should be noted that as used herein, reference to 'Exchange' 26 refers to substantially any market, including over-the-counter (OTC) markets by which assets may be transacted between parties.) At Step 206, Issuer 14 confirms the order with AP 12, e.g., by uploading an order confirmation form such as shown in FIG. 11.

It should be noted that in various embodiments, the Administrator/FAC 15 is communicably coupled to various trading platforms (e.g., Exchanges 26) to capture and display ticking quotes for the underlyings so the APs 12 know what prices they are paying. Moreover, these embodiments enable trades to be executed in real time, i.e., substantially immediately once the order is placed, to help prevent any slippage from taking place.

At Step 207, AP 12 transfers cash to Custodian/CC 18, and Global Paying Agent/PASC 24 issues respective units of ETPs to AP 12 by uploading to Issuer 14 an entry in the Issuer's book of uncertificated securities, e.g., as shown in FIG. 12. Concurrently, Global Paying Agent 24: (i) registers new units of ETPs in the main register of Exchange 26 and (ii) credits these new units to the AP's account at the Exchange 26 (e.g., creation of new ETPs as intermediated securities via delivery vs. payment (DVP) transfer instructions). At Step 208, upon completion of Step 207, Custodian/CC 18 confirms receipt of cash, e.g., via custodian API, to Issuer 14 and to Administrator 15 (and optionally to Calculation Agent (not shown) and Global Paying Agent 24). At Step 209, Final Terms & Conditions are posted by Issuer 14 on a public website for series upsize. At Step 210, Exchange 26 clears ETPs on a DFP/FOP basis and creates securities in the account of AP 12, while Global Paying Agent 24 notifies Issuer 14 of the completed transaction.

Figure 6B:
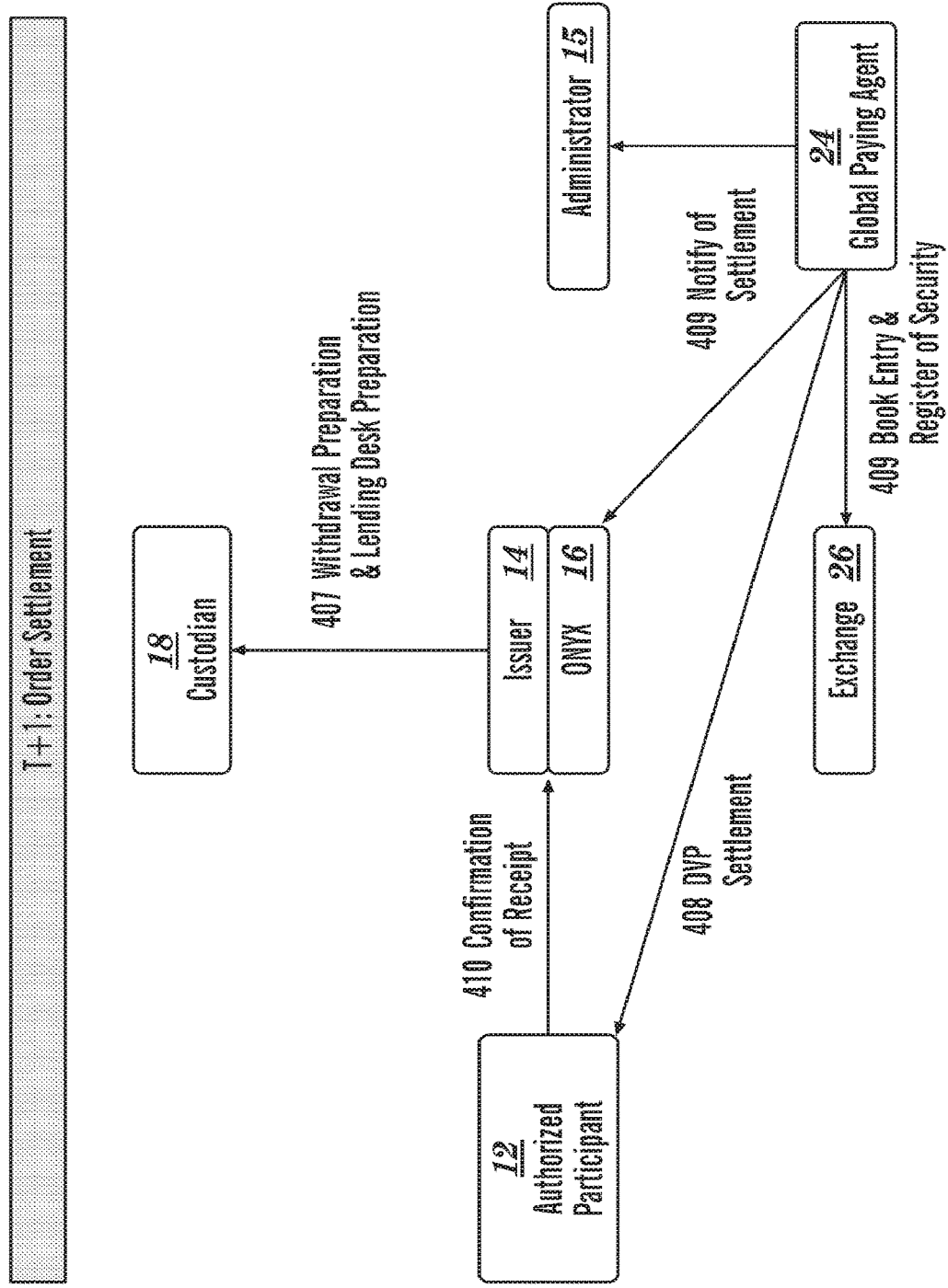
FIG. 6B is a functional block diagram showing the operational aspects of FIG. 6A.

As shown in FIGS. 6A-6B, a Cash AP Redemption Order involves the aforementioned PCF Creation Steps 1-4, followed by AP Creation Order In-Kind Steps 5 and 6, followed by Steps 407-410 on day T+1.

At Step 407, Issuer/PMC 14 instructs Custodian/CC 18 to prepare to retrieve Cash from the AP's account, e.g., using wire instructions, while Issuer 14 unwinds any short sale of the ETP. At Step 408, Global Paying Agent/PASC 24: (i) deregisters new units of ETPs in the main register of Exchange 26; and (ii) debits these from the AP's account with Exchange 26, via delivery free of payment (DVP) transfer instructions. At Step 409, upon completion of Step 8, Global Paying Agent 24 cancels respective units of ETPs to AP 12 via entry in the Issuers book of uncertificated securities, e.g., as shown in FIG. 12. Global Paying Agent/PASC 24 also notifies Issuer/PMC 14 and Administrator/FAC 15 of the cancellation. At Step 410, AP 12 confirms receipt of cash to Issuer 14.

Figure 6C:
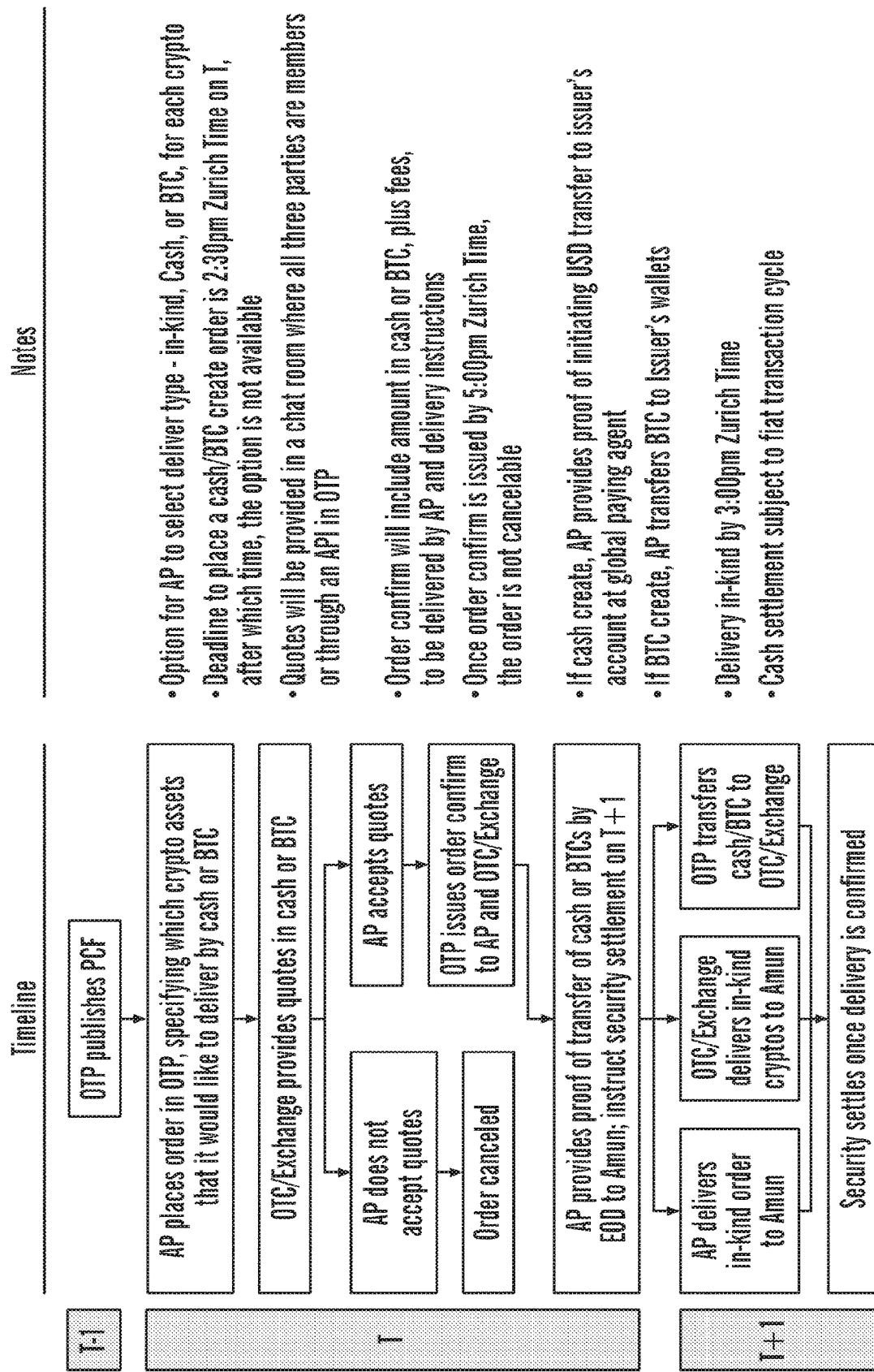
FIG. 6C is a flow chart showing additional aspects of embodiments of the present invention.
Figure 6D:
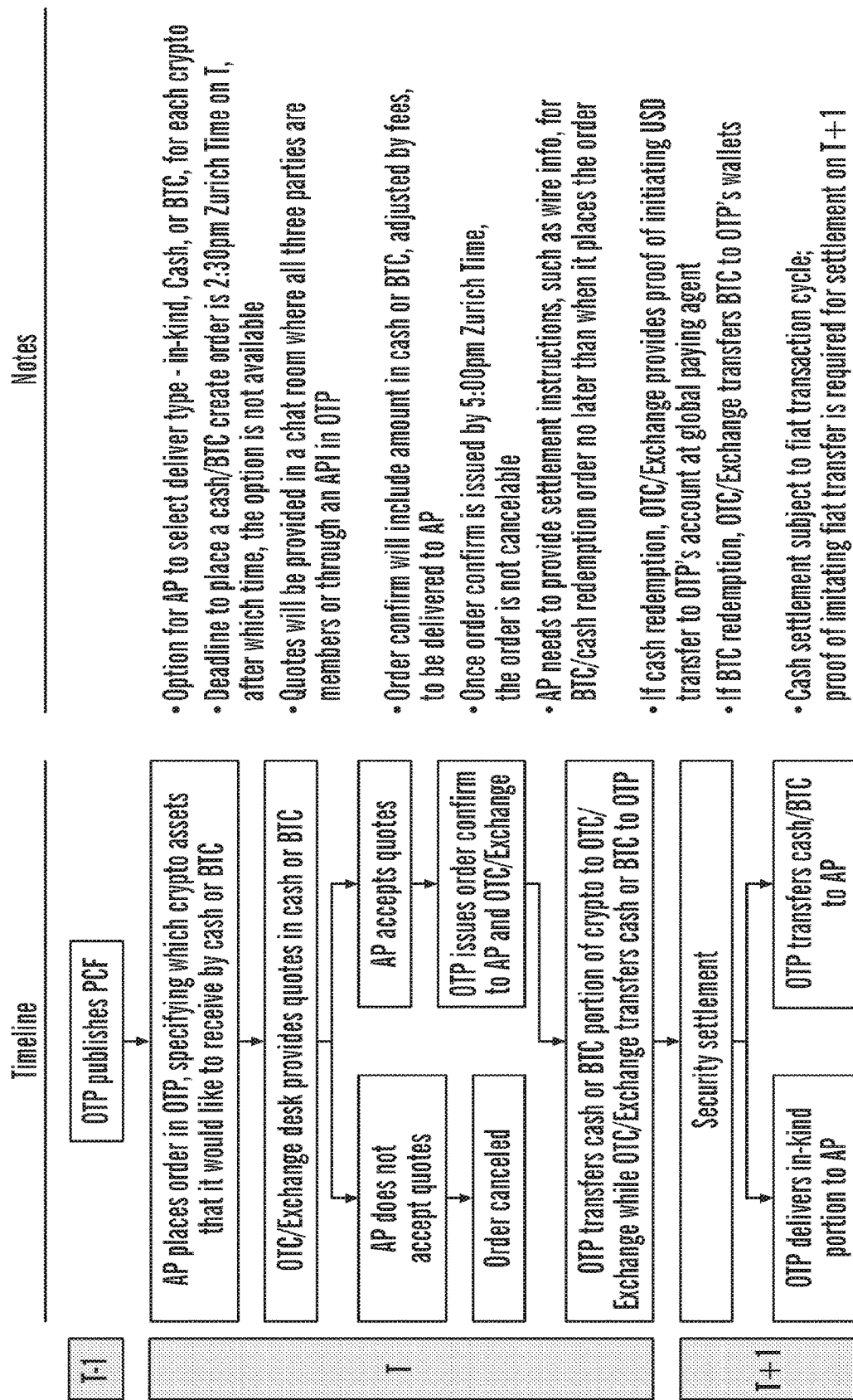
FIG. 6D is a flow chart showing additional aspects of embodiments of the present invention.

Turning now to FIGS. 6C and 6D, embodiments of the present invention optionally enable an AP 12 to send the OTP bitcoin (BTC) or stable coin in exchange for purchasing the relevant crypto on their behalf in a process referred to as a "BTC Create." In this process: OTP 16 consumes PCF information, OTP determines best execution on the market via API integrations with multiple custodians and exchanges, and the OTP displays ticking prices to Aps 12 who are then able to accept or reject the price. This process may be significantly less costly than conventional approaches used for conventional ETFs which require a staffed capital markets desk. In particular embodiments, e.g., involving an index with a relatively large number of components, this process is also more efficient than an in-kind settled process. This process also avoids exposing the issuer 14 or investors in the ETP to any slippage on execution.

Figure 6E:
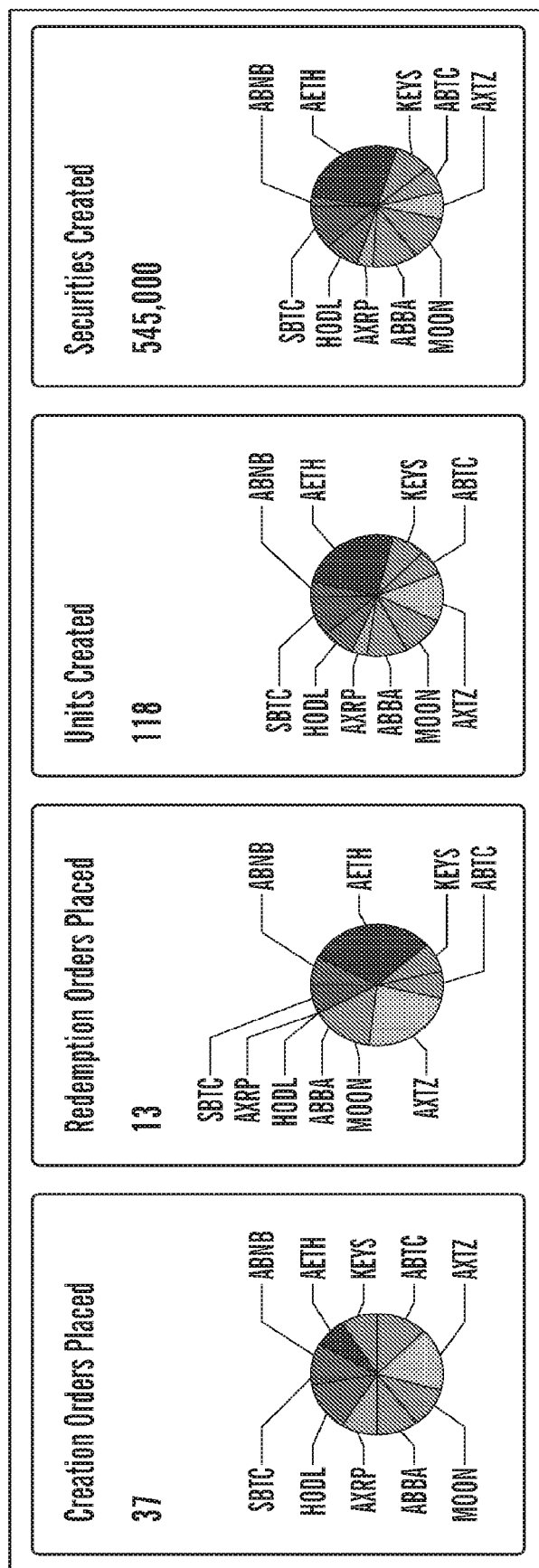
FIG. 6E is an image of a graphical user interface displaying various aspects of the present invention.
Figure 6F:
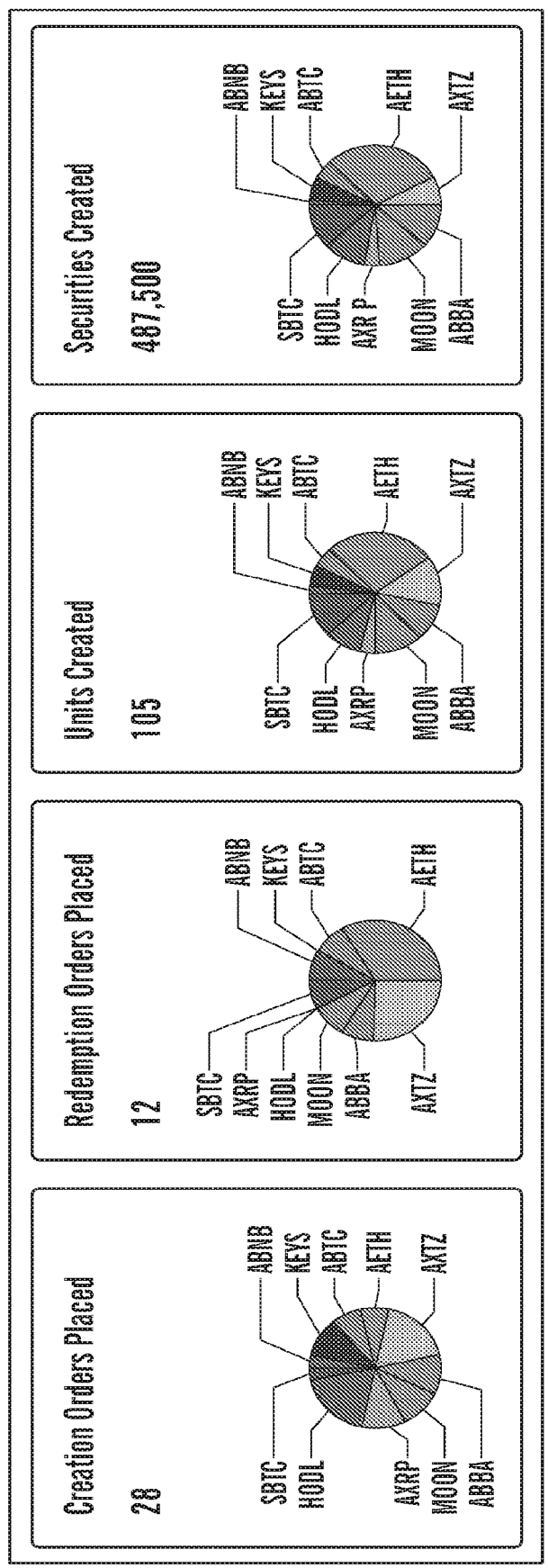
FIG. 6F is an image of another graphical user interface displaying various aspects of the present invention.
Figure 6G:
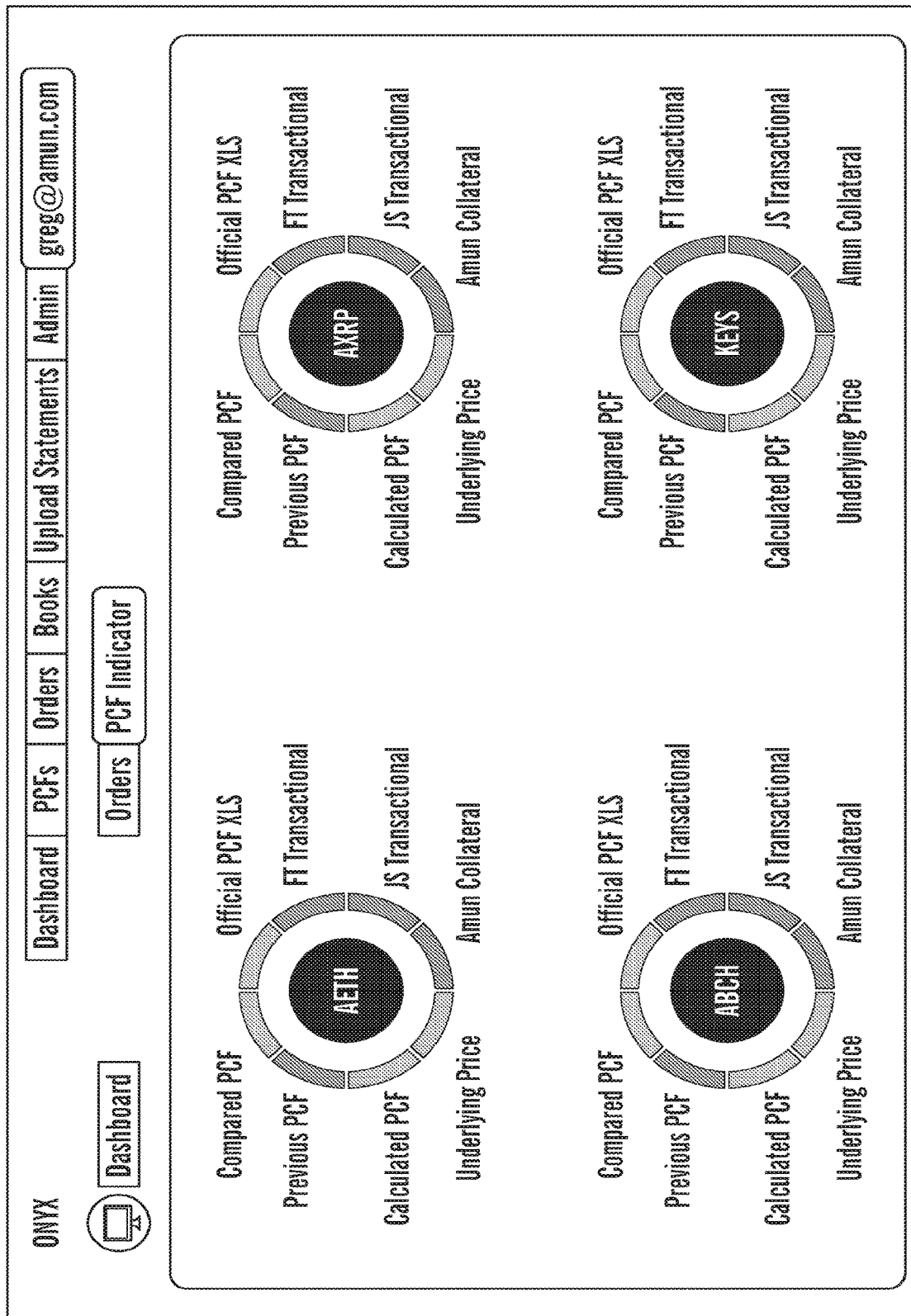
FIG. 6G is an image of still another graphical user interface displaying various aspects of the present invention.

Still further, as shown in FIGS. 6E-6G, data captured and parsed by these embodiments are then available through a dashboard which allows for easy data visualization, e.g., of order history, transactions, PCFs and values. This occurs in a centralized manner, by parsing the data captured in the various native formats from the specialized computers, to generate a result that is unavailable from conventional sources.

Dealings of Cryptos by Issuer

It should be recognized that during its course of business, the Issuer may engage in the sale of crypto assets for fiat currencies. Scenarios involving sale of crypto assets include but not limited to the following:

Investor Fees: crypto assets received as Investor Fee are sold periodically for fiat currencies to fund the day-to-day operation of the Issuer.

Additional Fees: the product may incur additional fees such as below; these fees will be deducted from the proceeds of any sale of crypto assets following the sale of investor fees, and may include Processing Fees Payable to Administrators & Accounting Team, Transaction Fees Payable to Custodian, and Other transaction fees payable to execution partners.

Rebalancing: the weight allocation of the Underlying Assets in the Index may change after the rebalancing at the end of each month, thus requiring the purchase or sale of crypto assets to ensure the Collateral properly matches the new composition. In particular embodiments, this rebalancing is accomplished automatically by OTP 16 by capturing updated index data, recalculating exposures, executing trades to achieve a desired balance. This allows execution as close to the rebalance time as possible to reduce the need for human traders and accountants (to help reduce cost and slippage).

Fork: new type of crypto assets may be created in the event of fork. In the situation where Authorized Participant delivers the newly forked crypto assets as part of its order, the Issuer may sell the newly forked assets received at the next rebalance.

Airdrop: similar to forks, forked assets may be sold at the next rebalance.

Fork

A "fork" is a scenario where a developer or group of developers can split the code base powering a crypto asset into two or more branches of variations of development. Forks result in the creation of a new asset which derives from the original blockchain. For example, a fork in the Bitcoin blockchain resulted in the creation of Bitcoin Cash. These new assets are completely separate new entities. The recipient of the new asset must take specific actions to receive the newly created units (including setting up a wallet on that blockchain). Holders of the original asset are under no obligation to do so and have the option to simply forgo the event.

Embodiments of the present invention may optionally support forks in the underlying assets, e.g., by adding the forked assets to the baskets of the underlying assets.

Airdrop

Airdrops are substantially equivalent to a dividend in kind and result in the creation/allocation of new units of an existing asset to participants in the blockchain. The new units of crypto asset are allocated to some but not necessarily all participants on a blockchain and are typically designed to incentivize specific behavior in the network (increased participation, maintaining infrastructure etc.). These actions are rare and generally only occur in smaller crypto assets (by market cap). Unlike a fork, an airdrop does not result in the creation of a new asset but rather allocated additional units to specific wallets (i.e. for every 1 BTC in a wallet would now have 2 BTC if it were participating in the airdrop). As a result, Airdrops do not require any special action to be taken by the Issuer in order to participate in the airdrop.

Figure 14:
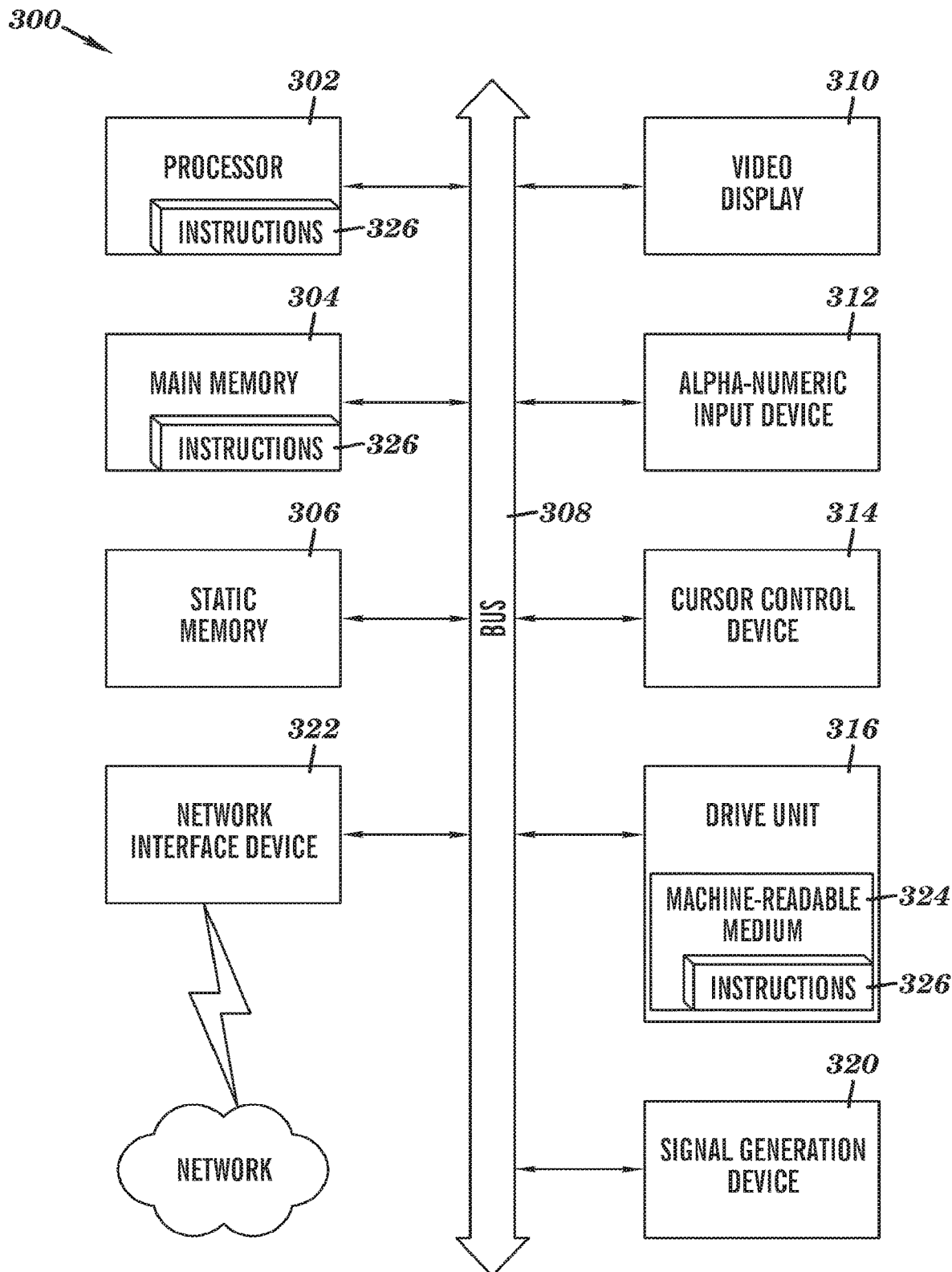
FIG. 14 is a block diagram of one embodiment of a computer system usable with embodiments of the present invention.

FIG. 14 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, and optical and magnetic disks.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

It should be noted that the various modules and other components of the embodiments discussed hereinabove may be configured as hardware, as computer readable code stored in any suitable non-transitory computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols.

Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Having thus described the invention, what is claimed is:

1. A computing system comprising:
   one or more processors;
   one or more memories including instructions executable by the one or more processors to cause the one or more processors to perform operations including:
      receiving a creation order for purchasing a number of units of an exchange traded product (ETP) that contains a cryptocurrency, wherein the creation order was submitted by an authorized participant;
      based on receiving the creation order:
         receiving a plurality of price quotes from a plurality of cryptocurrency exchanges for purchasing an amount of the cryptocurrency that corresponds to the number of units of the ETP, the plurality of cryptocurrency exchanges being separate from the computing system;
         selecting a particular exchange from among the plurality of cryptocurrency exchanges, the particular exchange being selected based on the plurality of price quotes;
         based on selecting the particular exchange, transmitting a communication over a computer network to the particular exchange, the particular exchange being configured to respond to the communication at least in part by executing a blockchain transaction that transmits the amount of the cryptocurrency to a blockchain wallet; and
         instructing delivery of the number of units of the ETP to the authorized participant;
      subsequent to the particular exchange executing the blockchain transaction, executing a blockchain explorer to receive updated portfolio data associated with the ETP;
      based on the updated portfolio data, generating a Portfolio Composite File (PCF) that includes a current Net Asset Value (NAV) for the ETP;
      encrypting the PCF to generate an encrypted PCF file; and
      transmitting the encrypted PCF file via a secure connection to an order taking platform computer (OTP).

2. The computing system of claim 1, wherein the blockchain wallet is associated with the authorized participant.

3. The computing system of claim 1, wherein selecting the particular exchange involves:
   receiving, from the authorized participant, a selection of a price quote among the plurality of price quotes.

4. The computing system of claim 1, wherein the plurality of cryptocurrency exchanges each include an over-the-counter (OTC) desk and a respective order book.

5. The computing system of claim 1, wherein the blockchain wallet is owned by a custodian that is separate from the computing system and the authorized participant.

6. The computing system of claim 5, wherein the operations further comprise:
   receiving, from a custodian computer of the custodian, a confirmation of the amount of the cryptocurrency associated with the creation order.

7. The computing system of claim 6, wherein the custodian computer is configured to:
   track cryptocurrency assets held by the ETP over time;
   periodically generate portfolio data indicating an amount of cryptocurrency assets held by the ETP; and
   provide the portfolio data for evaluation.

8. A method comprising:
   receiving, by one or more processors of a computing system, a creation order for purchasing a number of units of an exchange traded product (ETP) that contains a cryptocurrency, wherein the creation order was submitted by an authorized participant;
   based on receiving the creation order:
      receiving, by the one or more processors, a plurality of price quotes from a plurality of cryptocurrency exchanges for purchasing an amount of the cryptocurrency that corresponds to the number of units of the ETP, the plurality of cryptocurrency exchanges being separate from the computing system;

selecting, by the one or more processors, a particular exchange from among the plurality of cryptocurrency exchanges, the particular exchange being selected based on the plurality of price quotes;

based on selecting the particular exchange, transmitting, by the one or more processors, a communication over a computer network to the particular exchange, the particular exchange being configured to respond to the communication at least in part by executing a blockchain transaction that transmits the amount of the cryptocurrency to a blockchain wallet; and instructing, by the one or more processors, delivery of the number of units of the ETP to the authorized participant;

subsequent to the particular exchange executing the blockchain transaction, executing, by the one or more processors, a blockchain explorer to receive updated portfolio data associated with the ETP;

based on the updated portfolio data, generating, by the one or more processors, a Portfolio Composite File (PCF) that includes a current Net Asset Value (NAV) for the ETP;

encrypting, by the one or more processors, the PCF to generate an encrypted PCF file; and transmitting, by the one or more processors, the encrypted PCF file via a secure connection to an order taking platform computer (OTP).

9. The method of claim 8, wherein the blockchain wallet is associated with the authorized participant.

10. The method of claim 8, wherein selecting the particular exchange involves:
receiving, from the authorized participant, a selection of a price quote among the plurality of price quotes.

11. The method of claim 8, wherein the plurality of cryptocurrency exchanges each include an over-the-counter (OTC) desk and a respective order book.

12. The method of claim 8, wherein the blockchain wallet is owned by a custodian that is separate from the computing system and the authorized participant.

13. The method of claim 12, further comprising:
receiving, from a custodian computer of the custodian, a confirmation of the amount of the cryptocurrency associated with the creation order.

14. The method of claim 13, wherein the custodian computer is configured to:
track cryptocurrency assets held by the ETP over time;
periodically generate portfolio data indicating an amount of cryptocurrency assets held by the ETP; and
provide the portfolio data for evaluation.

15. A non-transitory computer-readable medium comprising program code that is executable by one or more processors of a computing system to cause the computing system to perform operations including:
receiving a creation order for purchasing a number of units of an exchange traded product (ETP) that contains a cryptocurrency, wherein the creation order was submitted by an authorized participant;
based on receiving the creation order:
receiving a plurality of price quotes from a plurality of cryptocurrency exchanges for purchasing an amount of the cryptocurrency that corresponds to the number of units of the ETP, the plurality of cryptocurrency exchanges being separate from the computing system;
selecting a particular exchange from among the plurality of cryptocurrency exchanges, the particular exchange being selected based on the plurality of price quotes;
based on selecting the particular exchange, transmitting a communication over a computer network to the particular exchange, the particular exchange being configured to respond to the communication at least in part by executing a blockchain transaction that transmits the amount of the cryptocurrency to a blockchain wallet; and
instructing delivery of the number of units of the ETP to the authorized participant;
subsequent to the particular exchange executing the blockchain transaction, executing a blockchain explorer to receive updated portfolio data associated with the ETP;
based on the updated portfolio data, generating a Portfolio Composite File (PCF) that includes a current Net Asset Value (NAV) for the ETP;
encrypting the PCF to generate an encrypted PCF file; and
transmitting the encrypted PCF file via a secure connection to an order taking platform computer (OTP).

16. The non-transitory computer-readable medium of claim 15, wherein the blockchain wallet is associated with the authorized participant.

17. The non-transitory computer-readable medium of claim 15, wherein selecting the particular exchange involves:
receiving, from the authorized participant, a selection of a price quote among the plurality of price quotes.

18. The non-transitory computer-readable medium of claim 15, wherein the plurality of cryptocurrency exchanges each include an over-the-counter (OTC) desk and a respective order book.

19. The non-transitory computer-readable medium of claim 15, wherein the blockchain wallet is owned by a custodian that is separate from the authorized participant.

20. The non-transitory computer-readable medium of claim 19, wherein the operations further comprise:
receiving, from a custodian computer of the custodian, a confirmation of the amount of the cryptocurrency associated with the creation order.

\* \* \* \* \*